United States Patent
Zacks et al.

(10) Patent No.: US 10,911,341 B2
(45) Date of Patent: Feb. 2, 2021

(54) FABRIC DATA PLANE MONITORING

(71) Applicant: Cisco Technology, Inc., San Jose, CA (US)

(72) Inventors: David John Zacks, Vancouver (CA); Vikram Vikas Pendharkar, San Jose, CA (US); Shawn Michael Wargo, San Jose, CA (US); Thomas Szigeti, Vancouver (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/547,002

(22) Filed: Aug. 21, 2019

(65) Prior Publication Data
US 2020/0162355 A1    May 21, 2020

Related U.S. Application Data

(60) Provisional application No. 62/769,154, filed on Nov. 19, 2018.

(51) Int. Cl.
| | |
|---|---|
| *G06F 15/16* | (2006.01) |
| *H04L 12/26* | (2006.01) |
| *H04L 12/721* | (2013.01) |

(52) U.S. Cl.
CPC ...... *H04L 43/0811* (2013.01); *H04L 43/0876* (2013.01); *H04L 43/12* (2013.01); *H04L 45/34* (2013.01)

(58) Field of Classification Search
CPC . H04L 43/0811; H04L 43/0876; H04L 43/12; H04L 45/34
See application file for complete search history.

(56) References Cited

U.S. PATENT DOCUMENTS

| | | | |
|---|---|---|---|
| 4,885,742 A * | 12/1989 | Yano | H04L 12/44 370/408 |
| 6,363,421 B2 * | 3/2002 | Barker | H04L 41/0213 709/202 |
| 6,859,829 B1 | 2/2005 | Parupudi et al. | |

(Continued)

OTHER PUBLICATIONS

International Search Report and Written Opinion from the International Searching Authority, dated Mar. 13, 2020, 12 pages, for corresponding International Patent Application No. PCT/US2019/060031.

*Primary Examiner* — Moustafa M Meky
*Assistant Examiner* — Thorne E Waugh
(74) *Attorney, Agent, or Firm* — Polsinelli PC

(57) ABSTRACT

Systems and methods provide for monitoring a state of a network fabric utilizing user traffic. A fabric node (e.g., switch, router, or other network device) can receive user traffic from a node (e.g., network device, network appliance, or endpoint). The fabric node can match the user traffic to a tuple stored in a hardware counter matrix of the fabric node, the tuple corresponding to a count in the hardware counter matrix. The fabric node can increment the count. The fabric node can transmit an active probe to the node in response to the count not incrementing within a first time. The fabric node can transmit to a network management system data indicative of a disconnection between the fabric node and the node in response to the fabric node not receiving a response to the active probe within a second time.

20 Claims, 17 Drawing Sheets

(56) References Cited

U.S. PATENT DOCUMENTS

| | | | | |
|---|---|---|---|---|
| 6,990,478 | B2* | 1/2006 | Loy | G06F 9/542 |
| | | | | 707/781 |
| 7,206,579 | B2* | 4/2007 | Gwon | H04W 36/30 |
| | | | | 370/331 |
| 7,372,835 | B2* | 5/2008 | Lee | H04W 8/087 |
| | | | | 370/331 |
| 7,958,453 | B1* | 6/2011 | Taing | H04L 12/1827 |
| | | | | 715/744 |
| 8,223,717 | B2* | 7/2012 | Dillon | H04W 8/12 |
| | | | | 370/331 |
| 8,937,865 | B1* | 1/2015 | Kumar | H04L 47/76 |
| | | | | 370/235 |
| 8,964,752 | B2 | 2/2015 | Zhang et al. | |
| 9,152,603 | B1* | 10/2015 | Kelly, III | G06F 3/0689 |
| 9,419,867 | B2 | 8/2016 | Okholm et al. | |
| 9,608,938 | B2 | 3/2017 | Venkatesan et al. | |
| 9,705,775 | B2 | 7/2017 | Zhang et al. | |
| 9,755,960 | B2 | 9/2017 | Moisand et al. | |
| 2006/0034290 | A1* | 2/2006 | Kalofonos | H04L 69/16 |
| | | | | 709/227 |
| 2006/0111108 | A1* | 5/2006 | Newbury | H04W 36/04 |
| | | | | 455/436 |
| 2009/0190549 | A1* | 7/2009 | Kim | H04W 36/0066 |
| | | | | 370/331 |
| 2011/0145363 | A1* | 6/2011 | Ananthanarayanan | |
| | | | | G06F 16/172 |
| | | | | 709/218 |
| 2014/0139351 | A1* | 5/2014 | Hsieh | G08C 15/06 |
| | | | | 340/870.02 |
| 2017/0019750 | A1* | 1/2017 | Palanisamy | H04W 4/70 |
| 2017/0156153 | A1* | 6/2017 | Hart | H04W 16/28 |
| 2018/0123867 | A1 | 5/2018 | Balasubramanian et al. | |
| 2018/0167466 | A1* | 6/2018 | Mu | H04L 67/143 |

* cited by examiner

FIG. 3D

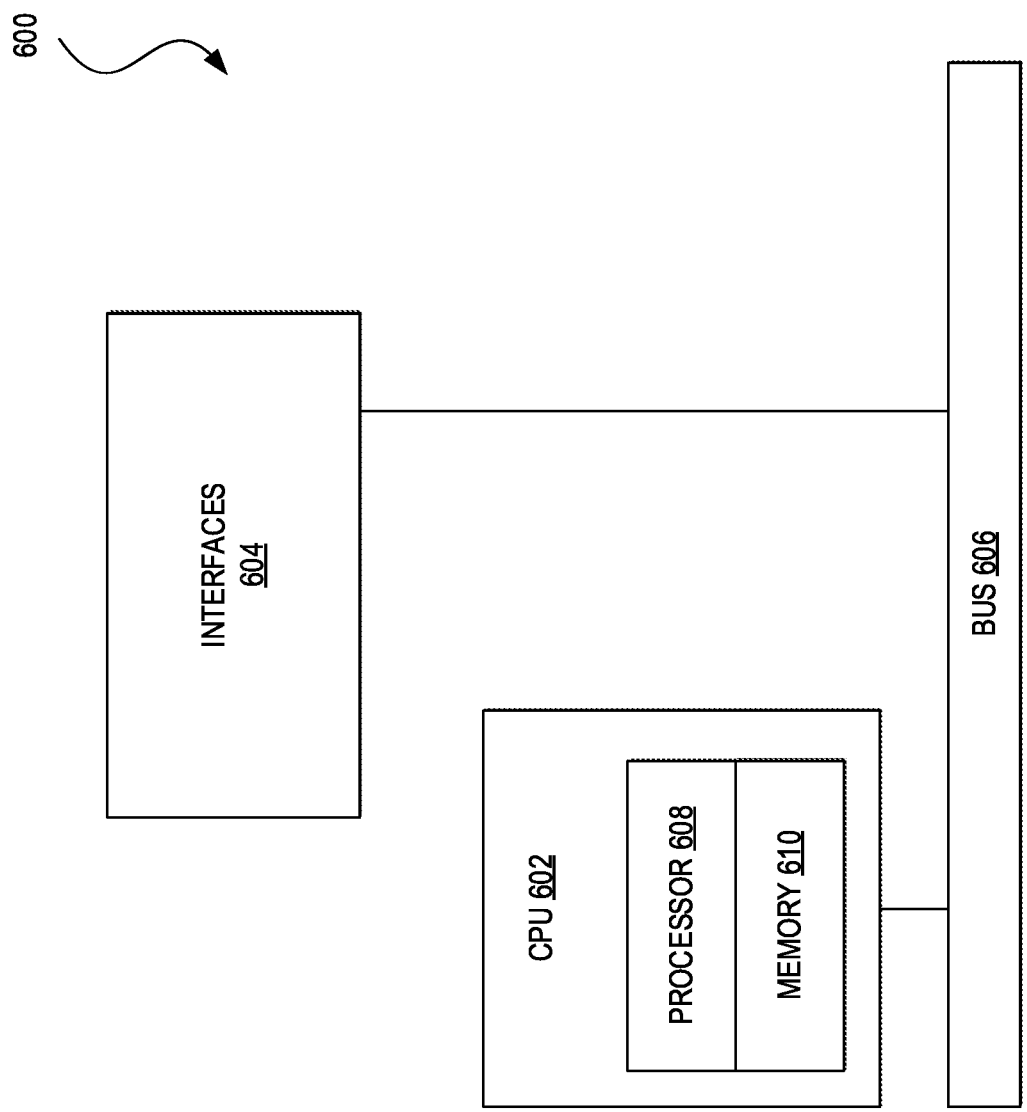

FABRIC DATA PLANE MONITORING

CROSS-REFERENCE TO RELATED APPLICATIONS

This application claims priority to U.S. Provisional Patent Application No. 62/769,154, filed on Nov. 19, 2018, the entire contents of which are incorporated herein by reference in its entirety.

TECHNICAL FIELD

The subject matter of this disclosure relates in general to the field of computer networking, and more particularly, to systems and methods for monitoring a state of a network device utilizing user traffic.

BACKGROUND

A campus network can provide connectivity to computing devices (e.g., servers, workstations, desktop computers, laptop computers, tablets, mobile phones, etc.) and things (e.g., desk phones, security cameras, lighting, Heating, Ventilating, and Air-conditioning (HVAC), windows, doors, locks, medical devices, industrial and manufacturing equipment, etc.) within environments such as offices, hospitals, colleges and universities, oil and gas facilities, factories, and similar locations. Some of the unique challenges a campus network may face include integrating wired and wireless devices, on-boarding computing devices and things that can appear anywhere in the network and maintaining connectivity when the devices and things migrate from location to location within the network, supporting Bring Your Own Device (BYOD) capabilities, connecting and powering Internet-of-Things (IoT) devices, and securing the network despite the vulnerabilities associated with Wi-Fi access, device mobility, BYOD, and IoT. Current approaches for deploying a network capable of providing these functions often require constant and extensive configuration and administration by highly skilled network engineers operating several different systems (e.g., directory-based identity services; Authentication, Authorization, and Accounting (AAA) services, wireless local area network (WLAN) controllers; command line interfaces for each switch, router, or other network device of the network; etc.) and manually stitching these systems together. This can make network deployment difficult and time-consuming, and impede the ability of many organizations to innovate rapidly and to adopt new technologies, such as video, collaboration, and connected workspaces.

Another issue with conventional campus networks is the poor performance associated with monitoring the state of the networks. This is typically achieved by actively probing each network device in the network over the control plane. As the network grows, the number of active probes required to monitor from/to every network edge node exponentially rises, such as by the function of [n(n−1)/2], where n can represent the number of edge nodes in the network. As a result, the load on the control plane significantly intensifies, as does the load on central processing unit (CPU) utilization of individual network devices, and the overall network performance correspondingly diminishes. Some of these effects can be mitigated to some degree by decreasing the number of active probes and/or the frequency of probes. However, this also renders network monitoring much less effective.

BRIEF DESCRIPTION OF THE FIGURES

To provide a more complete understanding of the present disclosure and features and advantages thereof, reference is made to the following description, taken in conjunction with the accompanying drawings, in which:

FIGS. 3A-3I illustrate examples of graphical user interfaces for a network management system in accordance with an embodiment;

FIG. 6 illustrates an example of a network device in accordance with an embodiment.

DESCRIPTION OF EXAMPLE EMBODIMENTS

Figure 1A:
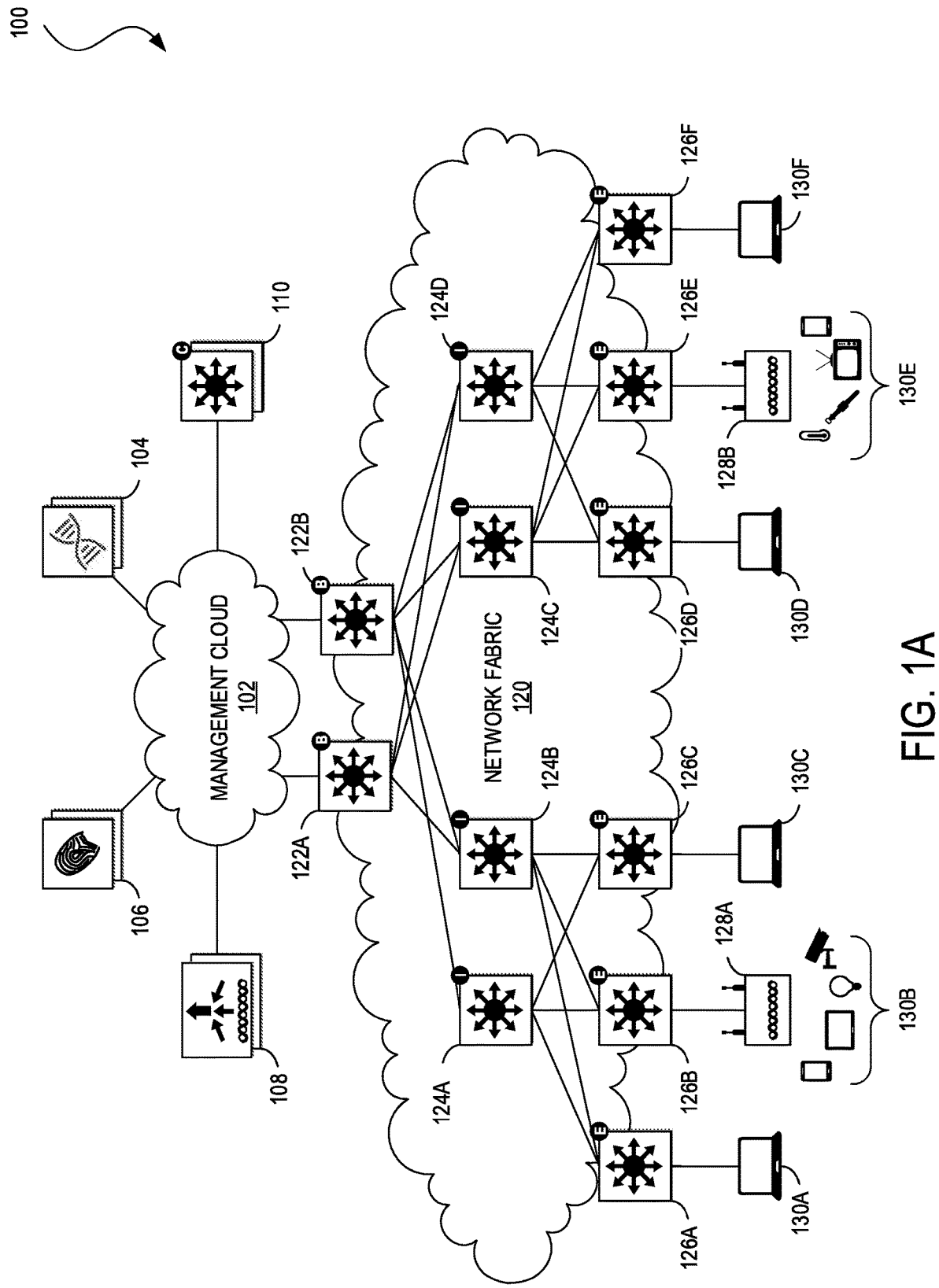
FIGS. 1A-1C illustrate examples of a physical topology of an enterprise network and various states of the enterprise network in accordance with some embodiments.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems and methods provide for monitoring a state of a network fabric utilizing user traffic. A fabric node (e.g., switch, router, or other network device) can receive user traffic from a node (e.g., network device, network appliance, or endpoint). The fabric node can match the user traffic to a tuple stored in a hardware counter matrix of the fabric node, the tuple corresponding to a count in the hardware counter matrix. The fabric node can increment the count. The fabric node can transmit an active probe to the node in response to the count not incrementing within a first time. The fabric node can transmit to a network management system data indicative of a disconnection between the fabric node and the node in response to the fabric node not receiving a response to the active probe within a second time.

Example Embodiments

A network can be divided into two primary areas of functionality—a control plane and a data plane. The control plane can carry signaling data and be responsible for routing traffic. The data plane (sometimes also referred to as the forwarding plane or user plane) can be responsible for pushing packets and carrying user traffic (also sometimes referred to as data traffic, data plane traffic, or forwarding plane traffic). For example, the data plane can comprise parts of the network that process packets and look up forwarding tables to forward data. The control plane can include elements that populate the forwarding tables.

Monitoring the status of network devices, connectivity, and path integrity are significant tasks for network assurance or ensuring security, availability, and compliance for a network. Conventional network assurance can involve actively probing network devices over the control plane even when the network is operating normally. This can increase the active traffic load and central processing unit (CPU) utilization of network devices that could otherwise be used for data traffic. The data plane is typically designed to optimize packet forwarding and may possibly have fewer resources available for other tasks. Thus, monitoring network state via the data plane is typically not practiced. In addition, current approaches for monitoring and reporting on network performance may not be suitable for the scale of enterprise networks. Various embodiments of the present disclosure can overcome these and other deficiencies of conventional approaches for network monitoring by using readily available hardware to passively monitor data plane traffic and actively probe network devices when an assurance issue (e.g., link loss, device reload, etc.) arises. Upon resolution of the fault, the network can return to passively monitoring the data plane. In this manner, active probing during normal operation of the network can be avoided. Monitoring can also occur at various levels of granularity (e.g., per physical network device, service, Virtual Local Area Network (VLAN), Virtual Extensible Local Area Network, etc.). In addition to the reduction in active traffic load and CPU utilization, limiting active probing to when issues arise can also make it easier to diagnose their root causes.

In some embodiments, hardware counters of network devices (e.g., switches, routers, etc.) can be used to match against a set of tuples. The tuples can include "one-tuples" in which the network device is implicitly one of the source or the destination, two-tuples (e.g., source Routing Locator (RLOC) and destination RLOC, source Internet Protocol (IP) address and destination IP address, or some combination of RLOC and IP address or other pair of source-destination identifiers), three-tuples (e.g., source-destination-Virtual Extensible Local Area Network (VXLAN) Network Identifier (VNID), source-destination-Virtual Private Network (VPN) label, or source, destination, and other network segment identifier), and so forth. When a packet matches a particular tuple upon transiting a network device in the data plane, the corresponding counter can be incremented in hardware (e.g., Application-Specific Integrated Circuit (ASIC) or Field Programmable Gate Array (FPGA)). A network management system can monitor the counters to determine the state of the network device. For example, if the counter is incrementing, the network management system can determine that traffic is flowing between the source and destination network devices as the incrementing counter can attest to the health of the two devices and the network path between them. As such, there may be no need for an active probe under these circumstances to verify connectivity. Thus, this method can eliminate the sender's incremental CPU utilization for the generation for such probes, the receiver's incremental CPU utilization to process and respond to such probes, and the corresponding incremental bandwidth to transport such probes. This can optimize the efficiency of the entire network, without sacrificing assurance.

When the counter ceases to increment, the network management system can determine that there may be an issue with one or both network devices and/or the path between them. The network management system can trigger an active probe on one or both of the network devices to determine the root cause of the problem. Once the counter begins incrementing again, the active probe can be deactivated.

This approach can substantially reduce the use of conventional software-based probes, lower the control plane load on device CPUs, and provide greater scalability for other types of probes. In addition, the network management system can be more responsive to network outage or impairment conditions. For example, conventional active probing may require lengthy inter-probe intervals when based on a control plane CPU to avoid impacting device performance overall. This is not an issue using hardware-based counters for steady-state monitoring that lowers the load on network devices.

This approach can be implemented in a number of services and devices, including RLOCs (e.g., fabric edge and border nodes) and control plane nodes in a fabric deployment (e.g., a Cisco® Software-Defined Access (SD-Access) deployment); network services, such as identity services (e.g., as provided by Cisco® Identity Services Engine (ISE)), Dynamic Host Configuration Protocol (DHCP) services, Domain Name System (DNS) services, etc.); and endpoints (e.g., point of sale (POS) servers, file servers, mail servers, Internet of Things (IoT) device servers, etc.); among other services and devices.

In various embodiments, a network management system can passively monitor normal traffic flows in hardware using flexible tuple counters, report anomalies when counters cease to increment, automatically initiate an active probe (e.g., Internet Control Message Protocol (ICMP) probe) when the corresponding hardware counter ceases to increment for a period of time (e.g., a short interval in the order of milliseconds or seconds), automatically cease active probing when the hardware counter beings to increment again, generate an alert when an issue occurs and provide relevant data to the network operator to facilitate troubleshooting of the root cause of the problem, visualize probe checks for monitored or recorded values, and retain data for devices for historical and trend line purposes.

FIG. 1A illustrates an example of a physical topology of an network 100. It should be understood that, for the network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the network 100 can include any number or type of resources, which can be accessed and utilized by endpoints or network devices. The illustrations and examples provided herein are for clarity and simplicity.

In this example, the network 100 includes a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configuration and policy distribution, as well as device management and analytics. The management cloud 102 can comprise one or more network controller appliances 104, one or more AAA appliances 106, one or more wireless local area network controllers (WLCs) 108, and one or more fabric control plane nodes 110. In other embodiments, one or more elements of the management cloud 102 may be co-located with the network fabric 120.

The network controller appliances 104 can function as the command and control system for one or more network fabrics, and can house automated workflows for deploying and managing the network fabrics. The network controller appliances 104 can include automation, design, policy, provisioning, and assurance capabilities, among others, as discussed further below with respect to FIG. 2. In some embodiments, one or more Cisco Digital Network Architecture (Cisco DNA™) appliances can operate as the network controller appliances 104.

The AAA appliances 106 can control access to computing resources, facilitate enforcement of network policies, audit usage, and provide information necessary to bill for services. The AAA appliance can interact with the network controller appliances 104 and with databases and directories containing information for users, devices, things, policies, billing, and similar information to provide authentication, authorization, and accounting services. In some embodiments, the AAA appliances 106 can utilize Remote Authentication Dial-In User Service (RADIUS) or Diameter to communicate with devices and applications. In some embodiments, one or more Cisco® Identity Services Engine (ISE) appliances can operate as the AAA appliances 106.

The WLCs 108 can support fabric-enabled access points attached to the network fabric 120, handling traditional tasks associated with a WLC as well as interactions with the fabric control plane for wireless endpoint registration and roaming. In some embodiments, the network fabric 120 can implement a wireless deployment that moves data-plane termination (e.g., Virtual Extensible Local Area Network (VXLAN)) from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some embodiments, one or more Cisco® Wireless Controllers, Cisco® Wireless Local Area Network (LAN), and/or other Cisco DNA™-ready wireless controllers can operate as the WLCs 108.

The network fabric 120 can comprise fabric border nodes 122A and 122B (collectively, 122), fabric intermediate nodes 124A-D (collectively, 124), and fabric edge nodes 126A-F (collectively, 126). Although the fabric control plane nodes 110 are shown to be external to the network fabric 120 in this example, in other embodiments, the fabric control plane nodes 110 may be co-located with the network fabric 120. In embodiments where the fabric control plane nodes 110 are co-located with the network fabric 120, the fabric control plane nodes 110 may comprise a dedicated node or set of nodes or the functionality of the fabric control nodes 110 may be implemented by the fabric border nodes 122.

The fabric control plane nodes 110 can serve as a central database for tracking all users, devices, and things as they attach to the network fabric 120, and as they roam around. The fabric control plane nodes 110 can allow network infrastructure (e.g., switches, routers, WLCs, etc.) to query the database to determine the locations of users, devices, and things attached to the fabric instead of using a flood and learn mechanism. In this manner, the fabric control plane nodes 110 can operate as a single source of truth about where every endpoint attached to the network fabric 120 is located at any point in time. In addition to tracking specific endpoints (e.g., /32 address for IPv4, /128 address for IPv6, etc.), the fabric control plane nodes 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 126 and provide the Layer 3 underlay for fabric overlay traffic.

The fabric edge nodes 126 can connect endpoints to the network fabric 120 and can encapsulate/decapsulate and forward traffic from these endpoints to and from the network fabric. The fabric edge nodes 126 may operate at the perimeter of the network fabric 120 and can be the first points for attachment of users, devices, and things and the implementation of policy. In some embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 126 for communication to outside subnets.

In this example, the network fabric can represent a single fabric site deployment which can be differentiated from a multi-site fabric deployment as discussed further below with respect to FIG. 4.

In some embodiments, all subnets hosted in a fabric site can be provisioned across every fabric edge node 126 in that fabric site. For example, if the subnet 10.10.10.0/24 is provisioned in a given fabric site, this subnet may be defined across all of the fabric edge nodes 126 in that fabric site, and endpoints located in that subnet can be placed on any fabric edge node 126 in that fabric. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-ready™ devices can operate as the fabric nodes 122, 124, and 126.

The network 100 can also include wired endpoints 130A, 130C, 130D, and 130F and wireless endpoints 130B and 130E (collectively, 130). The wired endpoints 130A, 130C, 130D, and 130F can connect by wire to fabric edge nodes 126A, 126C, 126D, and 126F, respectively, and the wireless endpoints 130B and 130E can connect wirelessly to wireless access points 128B and 128E (collectively, 128), respectively, which in turn can connect by wire to fabric edge nodes 126B and 126E, respectively. In some embodiments, Cisco Aironet® access points, Cisco Meraki® MR access points, and/or other Cisco DNA™-ready access points can operate as the wireless access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLCs 108 notifying the fabric control plane nodes 110 of joins, roams, and disconnects by the wireless endpoints 130 such that the fabric control plane nodes can have connectivity information about both wired and wireless endpoints in the network fabric 120, and can serve as the single source of truth for endpoints connected to the network fabric. For data plane integration, the WLCs 108 can instruct the fabric wireless access points 128 to form a VXLAN overlay tunnel to their adjacent fabric edge nodes 126. The Access Point (AP) VXLAN tunnel can carry segmentation and policy information to and from the fabric edge nodes 126, allowing connectivity and functionality identical or similar to that of a wired endpoint. When the wireless endpoints 130 join the network fabric 120 via the fabric wireless access points 128, the WLCs 108 can onboard the endpoints into the network fabric 120 and inform the fabric control plane nodes 110 of the endpoints' Media Access Control (MAC) addresses. The WLCs 108 can then instruct the fabric wireless access points 128 to form VXLAN overlay tunnels to the adjacent fabric edge nodes 126. Next, the wireless endpoints 130 can obtain IP addresses for themselves via Dynamic Host Configuration Protocol (DHCP). Once that completes, the fabric edge nodes 126 can register the IP addresses of the wireless endpoint 130 to the fabric control plane nodes 110 to form a mapping between the endpoints' MAC and IP addresses, and traffic to and from the wireless endpoints 130 can begin to flow.

Figure 1B:
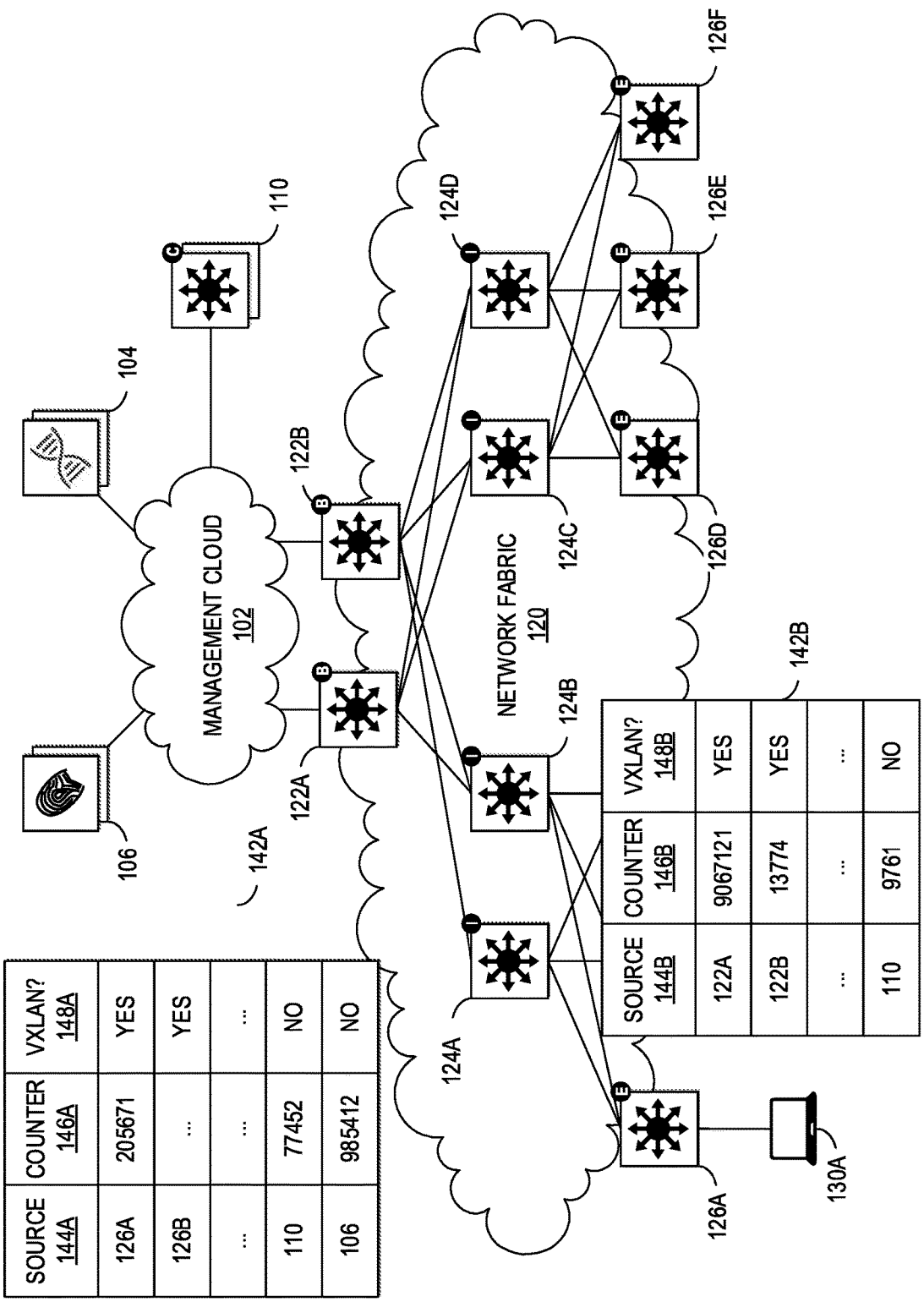

FIG. 1B illustrates an example of a state 140 of a portion of the network 100 in a steady state or a normal operational state. In this example, the state 140 includes a counter matrix 142A for the fabric border node 122A and a counter matrix 142B for the fabric edge node 126A (collectively, counters 142). In some embodiments, the counter matrices or counters 142 may be implemented in hardware, such as a programmable ASIC (e.g., the Cisco® Unified Access Data Plane (UADP) ASIC), Field Programmable Gate Array (FPGA), or other programmable chip. Each row of the counter matrix 142A can include a tuple 144A, a counter 146A, and an encapsulation flag 148A. The tuple 144A can identify the traffic processed by the fabric border node 122A by the traffic's source and destination (and network segment (e.g., VNID, VPN, Security Group Tag (SGT), Endpoint Group (EPG), etc.) if the traffic is encapsulated). The tuple 144A can include a source one-tuple in which the fabric border node 122A is implicitly the destination, a destination one-tuple in which the fabric border node 122A is implicitly the source, a source-destination two-tuple, a source-destination-VNID three-tuple, a source-destination-VPN three-tuple, and so forth. The counter 146A can be incremented when traffic matching the corresponding tuple 144A transits the fabric border node 122A. The incrementing of the counter 146A can indicate that the source and destination of the corresponding tuple 144A and the link between them appear to be operational. The encapsulation flag 148 can indicate whether the traffic is encapsulated (e.g., VXLAN, VPN, etc.).

During the steady state, the endpoint 130A may generate user traffic, such as by logging into the network and invoking a request for the services of the AAA appliances 106. The endpoint 130A may send the user traffic to the fabric edge node 126A. The fabric edge node 126A may encapsulate the user traffic with a destination identifier associated with the fabric border node 122A and a source identifier associated with the edge node 126A, and forward the encapsulated traffic to the fabric node 122A. The fabric border node 122A can receive the encapsulated user traffic, match the user traffic to the tuple 144A in which the source is associated with the fabric edge node 126A and the destination (not shown) is associated with the fabric border node 122A. Network devices may maintain a single counter matrix or multiple counter matrices, such as counter matrix in which the fabric node 122A is implicitly the source and a counter matrix in which the fabric node 122 is implicitly the destination, matrices for each network segment, and so forth. Various storage schemes may be utilized as would be understood by one of ordinary skill in the art.

When the fabric node 122A receives the encapsulated user traffic, it may increment the counter 146A (e.g., from 205671 to 205672) to indicate that the fabric edge node 126A and the path between the fabric border node 122A and the fabric edge node 126A is healthy. In some embodiments, network devices may periodically transmit their counters to other nodes (e.g., the network controller appliances 104, the fabric control nodes 110, other fabric nodes 122, the fabric edge nodes 126, etc.) to report on the state of the network. Various distribution schemes may be used as would be understood by one of ordinary skill in the art, and so long as the counter 146A increments, the fabric border node 122A and other nodes (e.g., the fabric nodes 110, 122, and 126, the network controller appliances 104, etc.) receiving its counter data may conclude that the fabric edge node 126A is alive, and there is no need for active probing.

The fabric border node 122A may forward the user traffic to the AAA appliances 106 and receive server traffic in response. The fabric border node 122A can encapsulate the server traffic with a destination identifier associated with the fabric edge node 126A and a source identifier associated with the fabric border node 122A, and forward the encapsulated server traffic to the fabric edge node 126A. The fabric edge node 126A can receive the encapsulated server traffic, match the server traffic to the tuple 144B where the source is the fabric border node 122A, and increment the counter 146B (e.g., from 9067121 to 9067122). So long as the counter 146B increments, the fabric edge node 126A and nodes receiving the fabric edge node's counter data may conclude that the fabric border node 122A is alive, and there is no need for active probing.

The fabric border node 122A can likewise conclude that the fabric control plane nodes 110 are alive when the counter 146A of the tuple associated with the fabric control plane nodes increment (e.g., from 77452 to 77453) and that the AAA appliances 106 are alive when the counter 146A associated with the AAA appliances 106 increment (e.g., from 985412 to 985413). Similarly, the fabric edge node 126A can conclude that the fabric border node 122B is alive when the counter 146B of the tuple associated with the fabric border node 122B increments (e.g., from 13774 to 13775) and that the fabric control plane nodes 110 are alive when the counter 146B of the tuple associated with the fabric control plane nodes 110 increment (e.g., from 9761 to 9762). In some embodiments, this steady-state monitoring may be extended to network segment monitoring by maintaining counters for each network segment (e.g., VNID, VPN, SGT, EPG, etc.).

Figure 1C:
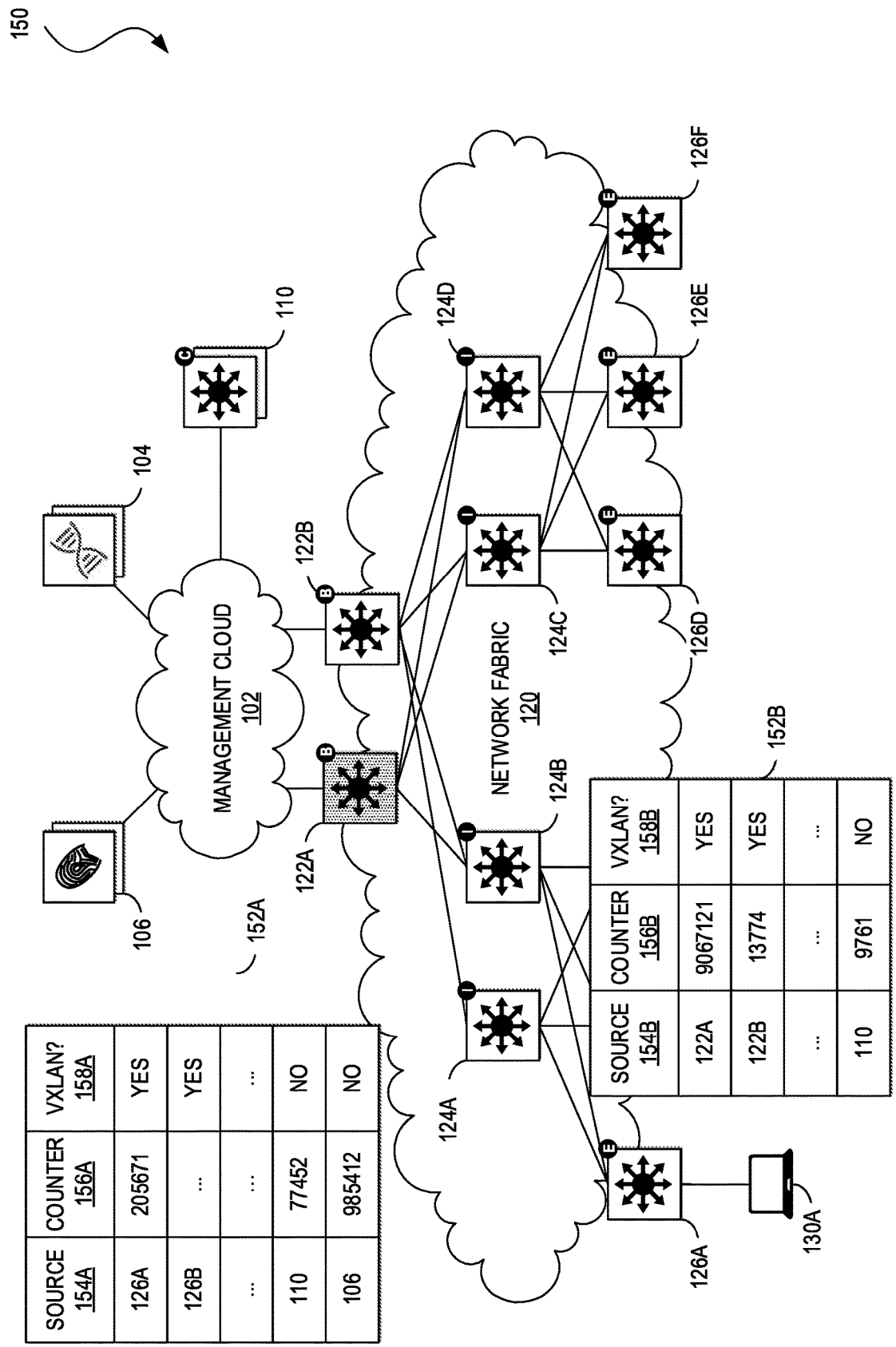

FIG. 1C illustrates an example of a state 150 of a portion of the network 100 in an error state or in a non-operational state, such as non-operation of the fabric border node 122A. This can cause the counter 146B of the tuple associated with the fabric border node 122A to stop incrementing (e.g., the counter stays at 9067121 for a specified duration). In response, the fabric edge node 126A can automatically begin an active probe to the affected node (e.g., the fabric border node 122A) after a suitable timeout interval (which can be determined by configuration). If the fabric border node 122A responds to the active probe, the fabric border node 122A can be re-instated as an active node from the point of view of the fabric edge node 126A (e.g., the fabric edge node 126A can continue passively monitoring traffic to the fabric border node 122A and incrementing the corresponding counter). This "false positive" can occur if there was no data transmitted to the fabric border node 122A before the timeout period expired, and the fabric edge node 126A would not report to the network controller appliances 104 as an outage. In some embodiments, this event can be recorded to readjust the timeout interval.

If there is no response to the active probe after a defined interval, the fabric edge node 126A can notify the network controller appliances 104 of the outage. The other fabric edge nodes 126 may also note the same, initiate their own active probes, and report the issue to the network controller appliances 104. The network controller appliances 104 can correlate the probe reports to determine the scope of the problem (e.g., whether the problem is local to an edge, a distribution, or network-wide). Thus, active probes may only be used when there is an actual outage such that connectivity monitoring is scalable and the network can be more responsive to actual faults. In addition, if every fabric node continuously runs passive monitoring, the network controller appliances 104 can obtain a global view of the network and more easily determine the root cause of outages.

After the problem with the fabric border node 122A is resolved and the fabric border comes back up, the fabric border node 122A can respond to the active probes and the network can reconverge. That is, the fabric border node 122A responding to the active probes and the actual flow of real user network traffic can cause all of the counters to begin incrementing again. This can cause all active probes to cease, and streaming of counter data may stop or may occur much more infrequently. This approach can also be used at each of the fabric border nodes 122 to monitor each of the fabric edge nodes 126. Likewise, this approach can be used at each of the fabric border nodes 122 to monitor any external services and devices (e.g., AAA services, DHCP services, POS servers, file servers, mail servers, IoT device servers, etc.). In this manner, greater scale can be achieved because of the targeted nature of active probing, which may only occur when there is a real problem. In addition, CPU utilization may be negligible to implement passive monitoring because of the use of hardware counters and the leveraging of real user traffic flows that the network devices must process in their normal course of operation.

Figure 2:
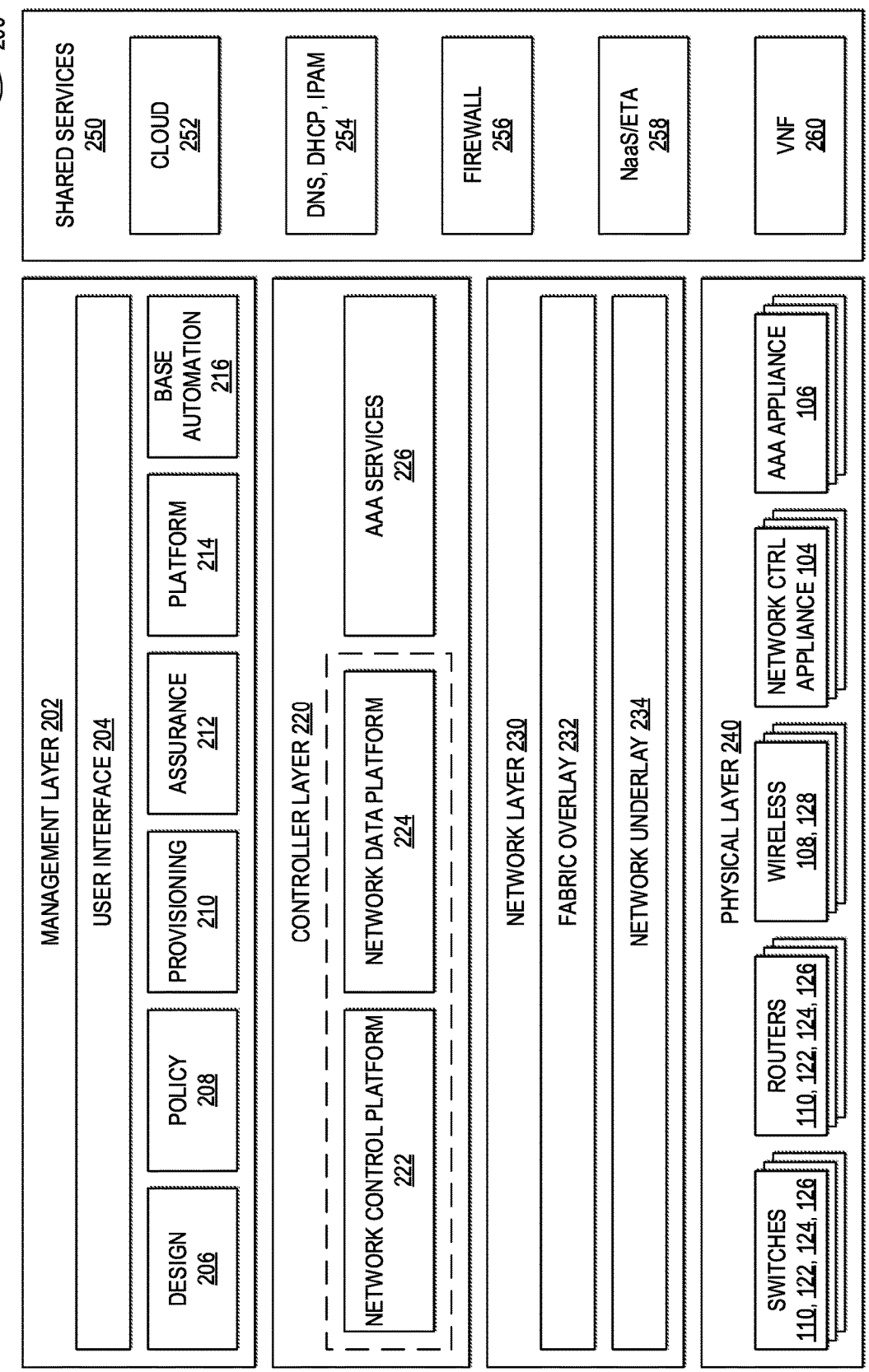
FIG. 2 illustrates an example of a logical architecture for an enterprise network in accordance with an embodiment.

FIG. 2 illustrates an example of a software architecture or logical architecture 200 for an enterprise network (e.g., the network 100). One of ordinary skill in the art will understand that, for the logical architecture 200 and any system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. In this example, the logical architecture 200 includes a management layer 202, a controller layer 220, a network layer 230 (such as embodied by the network fabric 120), a physical layer 240 (such as embodied by the various elements of FIG. 1), and a shared services layer 250.

The management layer 202 can abstract the complexities and dependencies of other layers and provide a user with tools and workflows to manage an enterprise network (e.g., the network 100). The management layer 202 can include a user interface 204, design functions 206, policy functions 208, provisioning functions 210, assurance functions 212, platform functions 214, and base automation functions 216. The user interface 204 can provide a user a single point to manage and automate the network. The user interface 204 can be implemented within a web application/web server accessible by a web browser and/or an application/application server accessible by a desktop application, a mobile app, a shell program or other command line interface (CLI), an Application Programming Interface (e.g., restful state transfer (REST), Simple Object Access Protocol (SOAP), Service Oriented Architecture (SOA), etc.), and/or other suitable interface in which the user can configure network infrastructure, devices, and things that are cloud-managed; provide user preferences; specify policies, enter data; review statistics; configure interactions or operations; and so forth. The user interface 204 may also provide visibility information, such as views of a network, network infrastructure, computing devices, and things. For example, the user interface 204 can provide a view of the status or conditions of the network, the operations taking place, services, performance, a topology or layout, protocols implemented, running processes, errors, notifications, alerts, network structure, ongoing communications, data analysis, and so forth.

The design functions 206 can include tools and workflows for managing site profiles, maps and floor plans, network settings, and IP address management, among others. The policy functions 208 can include tools and workflows for defining and managing network policies. The provisioning functions 210 can include tools and workflows for deploying the network. The assurance functions 212 can use machine learning and analytics to provide end-to-end visibility of the network by learning from the network infrastructure, endpoints, and other contextual sources of information. The platform functions 214 can include tools and workflows for integrating the network management system with other technologies. The base automation functions 216 can include tools and workflows to support the policy functions 208, the provisioning functions 210, the assurance functions 212, and the platform functions 214.

In some embodiments, the design functions 206, the policy functions 208, the provisioning functions 210, the assurance functions 212, the platform functions 214, and the base automation functions 216 can be implemented as microservices in which respective software functions are implemented in multiple containers communicating with each rather than amalgamating all tools and workflows into a single software binary. Each of the design functions 206, policy functions 208, provisioning functions 210, assurance functions 212, and platform functions 214 can be viewed as a set of related automation microservices to cover the design, policy authoring, provisioning, assurance, and cross-platform integration phases of the network lifecycle. The base automation functions 216 can support the top-level functions by allowing users to perform certain network-wide tasks.

FIGS. 3A-3I illustrate examples of graphical user interfaces for implementing the user interface 204. Although FIGS. 3A-3I show the graphical user interfaces as comprising webpages displayed in a browser executing on a large form-factor general purpose computing device (e.g., server, workstation, desktop, laptop, etc.), the principles disclosed in the present disclosure are widely applicable to endpoints of other form factors, including tablet computers, smart phones, wearable devices, or other small form-factor general purpose computing devices; televisions; set top boxes; IoT devices; and other electronic devices capable of connecting to a network and including input/output components to enable a user to interact with a network management system. One of ordinary skill will also understand that the graphical user interfaces of FIGS. 3A-3I are but one example of a user interface for managing a network. Other embodiments may include a fewer number or a greater number of elements.

Figure 3A:
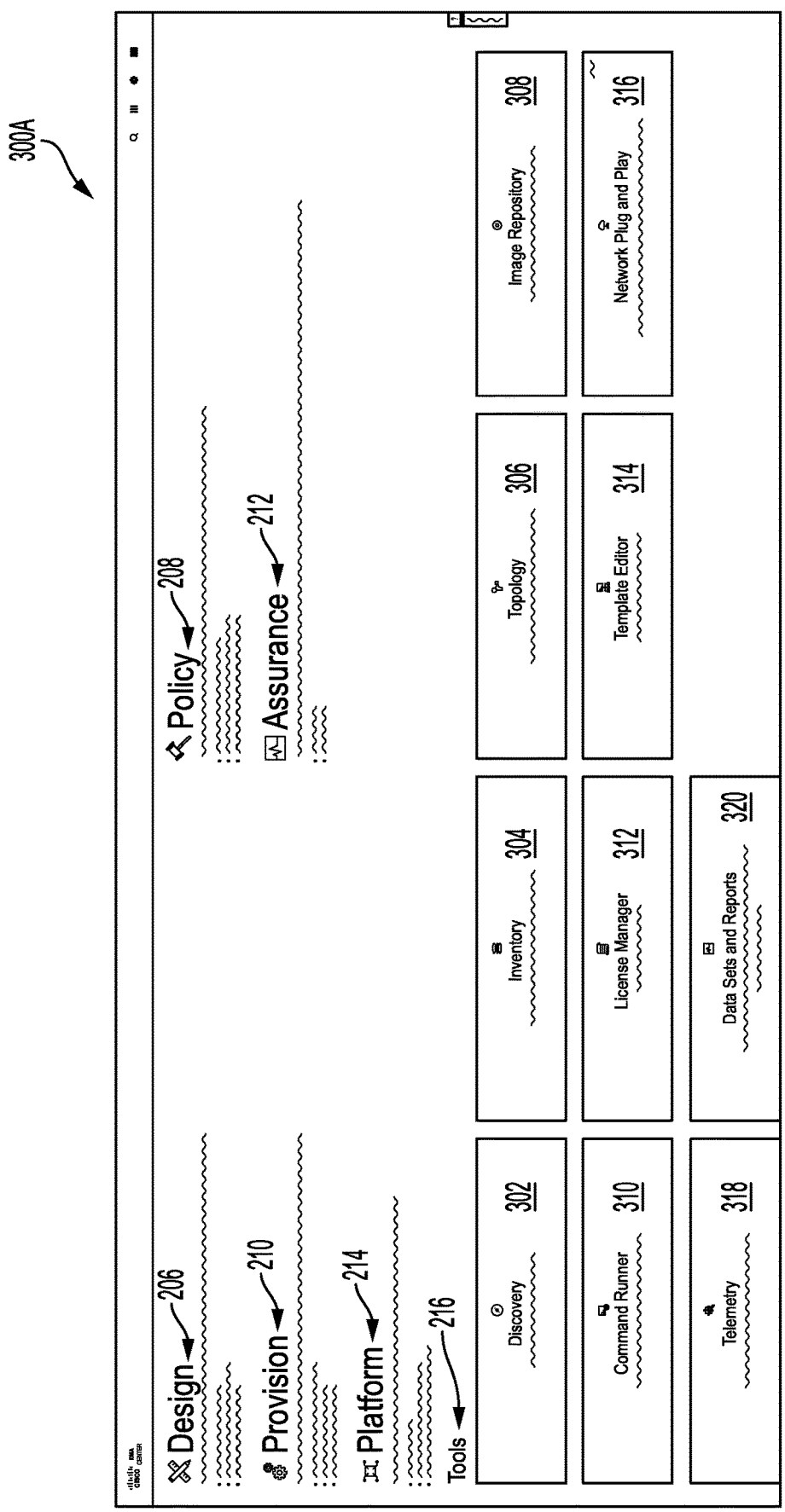

FIG. 3A illustrates a graphical user interface 300A, which is an example of a landing screen or a home screen of the user interface 204. The graphical user interface 300A can include user interface elements for selecting the design functions 206, the policy functions 208, the provisioning functions 210, the assurance functions 212, and the platform functions 214. The graphical user interface 300A also includes user interface elements for selecting the base automation functions 216. In this example, the base automation functions 216 include:

A network discovery tool 302 for automating the discovery of existing network devices to populate into inventory;

An inventory management tool 304 for managing the set of physical and virtual network elements;

A topology tool 306 for visualizing the physical topology of network devices;

An image repository tool 308 for managing software images for network devices;

A command runner tool 310 for diagnosing one or more network devices based on a CLI;

A license manager tool 312 for administering visualizing software license usage in the network;

A template editor tool 314 for creating and authoring CLI templates associated with network devices in a design profile;

A network PnP tool 316 for supporting the automated configuration of network devices;

A telemetry tool 318 for designing a telemetry profile and applying the telemetry profile to network devices; and A data set and reports tool 320 for accessing various data sets, scheduling data extracts, and generating reports in multiple formats (e.g., Post Document Format (PDF), comma-separate values (CSV), Tableau, etc.), such as an inventory data report, a software image management (SWIM) server report, and a client data report, among others.

Figure 3B:
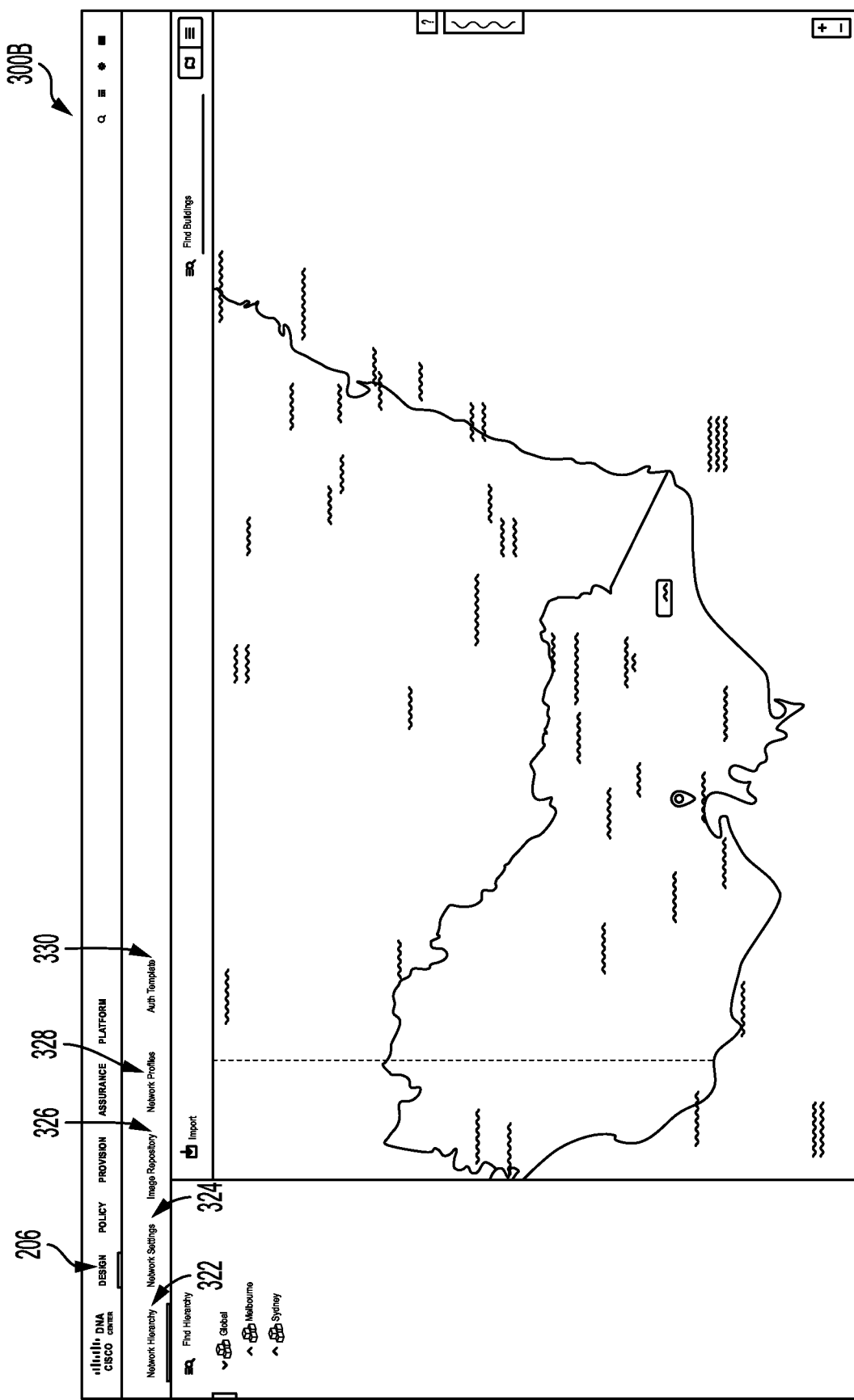

FIG. 3B illustrates a graphical user interface 300B, an example of a landing screen for the design functions 206. The graphical user interface 300B can include user interface elements for various tools and workflows for logically defining an enterprise network. In this example, the design tools and workflows include:

A network hierarchy tool 322 for setting up the geographic location, building, and floor plane details, and associating these with a unique site id;

A network settings tool 324 for setting up network servers (e.g., Domain Name System (DNS), DHCP, AAA, etc.), device credentials, IP address pools, service provider profiles (e.g., Quality of Service (QoS) classes for a WAN provider), and wireless settings;

An image management tool 326 for managing software images and/or maintenance updates, setting version compliance, and downloading and deploying images;

A network profiles tool 328 for defining LAN, WAN, and WLAN connection profiles (including Service Set Identifiers (SSIDs)); and An authentication template tool 330 for defining modes of authentication (e.g., closed authentication, Easy Connect, open authentication, etc.).

The output of the design workflow 206 can include a hierarchical set of unique site identifiers that define the global and forwarding configuration parameters of the various sites of the network. The provisioning functions 210 may use the site identifiers to deploy the network.

Figure 3C:
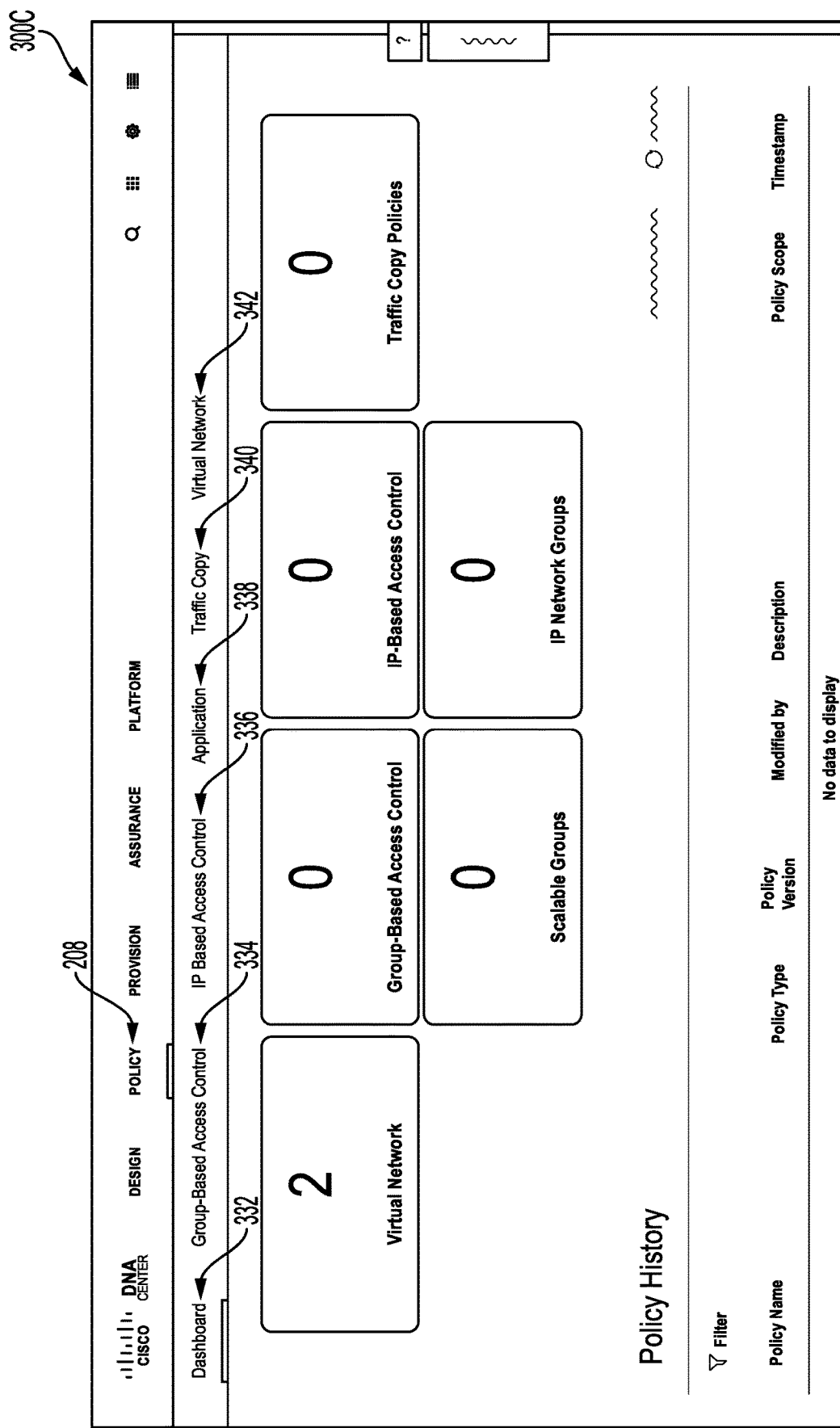

FIG. 3C illustrates a graphical user interface 300C, an example of a landing screen for the policy functions 208. The graphical user interface 300C can include various tools and workflows for defining network policies. In this example, the policy design tools and workflows include:

A policy dashboard 332 for viewing virtual networks, group-based access control policies, IP-based access control policies, traffic copy policies, scalable groups, and IP network groups. The policy dashboard 332 can also show the number of policies that have failed to deploy. The policy dashboard 332 can provide a list of policies and the following information about each policy: policy name, policy type, policy version (e.g., iteration of policy which can be incremented each time the policy changes, user who has modified the policy, description, policy scope (e.g., user and device groups or applications that the policy affects), and timestamp;

A group-based access control policies tool 334 for managing group-based access controls or Security Group Access Control List (SGACLs). A group-based access control policy can define scalable groups and an access contract (e.g., rules that make up the access control policies, such as permit or deny when traffic matches on the policy);

An IP-based access control policies tool 336 for managing IP-based access control policies. An IP-based access control can define an IP network group (e.g., IP subnets that share same access control requirements) and an access contract;

An application policies tool 338 for configuring QoS for application traffic. An application policy can define application sets (e.g., sets of applications that with similar network traffic needs) and a site scope (e.g., the site to which an application policy is defined);

A traffic copy policies tool 340 for setting up an Encapsulated Remote Switched Port Analyzer (ERSPAN) configuration such that network traffic flow between two entities is copied to a specified destination for monitoring or troubleshooting. A traffic copy policy can define the source and destination of the traffic flow to copy and a traffic copy contract that specifies the device and interface where the copy of traffic is sent; and A virtual network policies tool 343 for segmenting the physical network into multiple logical networks.

The output of the policy workflow 208 can include a set of virtual networks, security groups, and access and traffic policies that define the policy configuration parameters of the various sites of the network. The provisioning functions 210 may use the virtual networks, groups, and policies for deployment in the network.

Figure 3D:
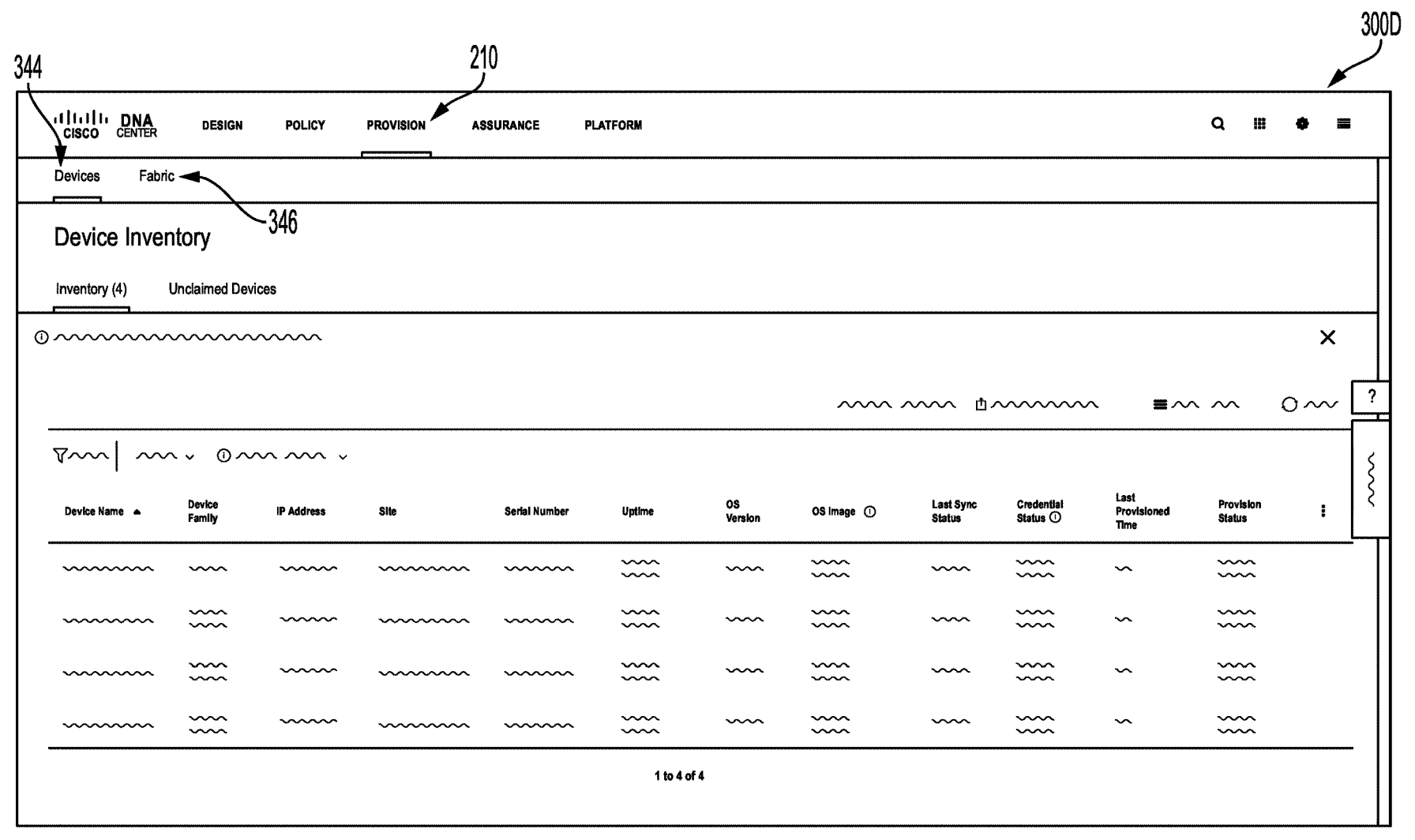

FIG. 3D illustrates a graphical user interface 300D, an example of a landing screen for the provisioning functions 210. The graphical user interface 300D can include various tools and workflows for deploying the network. In this example, the provisioning tools and workflows include:

A device provisioning tool 344 for assigning devices to the inventory and deploying the required settings and policies, and adding devices to sites; and A fabric provisioning tool 346 for creating fabric domains and adding devices to the fabric.

The output of the provisioning workflow 210 can include the deployment of the network underlay and fabric overlay, as well as policies (defined in the policy workflow 208).

Figure 3E:
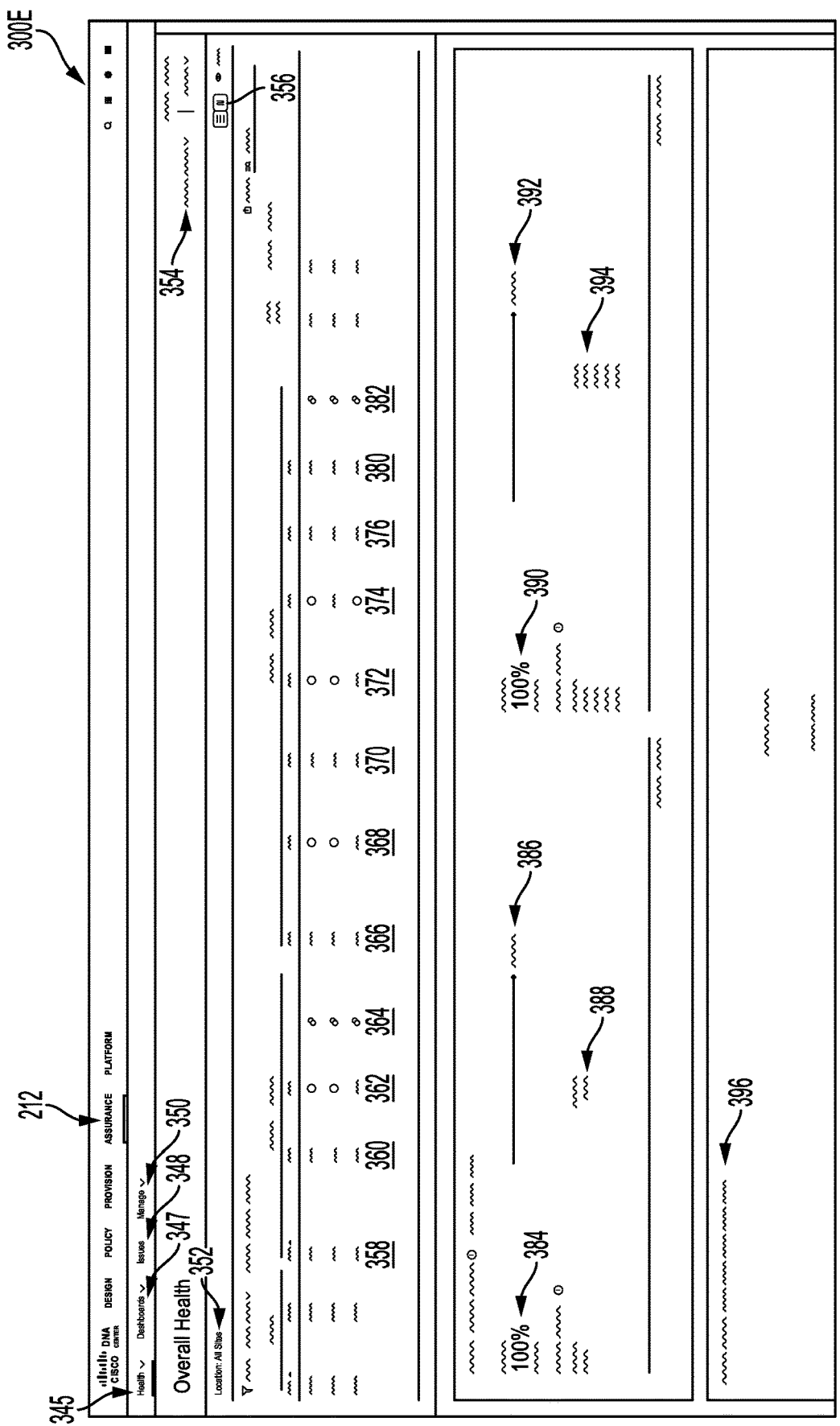

FIG. 3E illustrates a graphical user interface 300E, an example of a landing screen for the assurance functions 212. The graphical user interface 300E can include various tools and workflows for managing the network. In this example, the assurance tools and workflows include:

A health overview tool 345 for providing a global view of the enterprise network, including network devices and endpoints. The user interface element (e.g., drop-down menu, a dialog box, etc.) associated with the health overview tool 345 can also be toggled to switch to additional or alternative views, such as a view of the health of network devices alone, a view of the health of all wired and wireless clients, and a view of the health of applications running in the network as discussed further below with respect to FIGS. 3F-3H;

An assurance dashboard tool 347 for managing and creating custom dashboards;

An issues tool 348 for displaying and troubleshooting network issues; and

A sensor management tool 350 for managing sensor-driven tests.

The graphical user interface 300E can also include a location selection user interface element 352, a time period selection user interface element 354, and a view type user interface element 355. The location selection user interface element 352 can enable a user to view the overall health of specific sites (e.g., as defined via the network hierarchy tool 322) and/or network domains (e.g., LAN, WLAN, WAN, data center, etc.). The time period selection user interface element 354 can enable display of the overall health of the network over specific time periods (e.g., last 3 hours, last 24 hours, last 7 days, custom, etc.). The view type user interface element 355 can enable a user to toggle between a geographical map view of the sites of the network (not shown) or a hierarchical site/building view (as shown).

Within the hierarchical site/building view, rows can represent the network hierarchy (e.g. sites and buildings as defined by the network hierarchy tool 322); column 358 can indicate the number of healthy clients as a percentage; column 360 can indicate the health of wireless clients by a score (e.g., 1-10), color and/or descriptor (e.g., red or critical associated with a health score 1 to 3 indicating the clients have critical issues, orange or warning associated with a health score of 4 to 7 indicating warnings for the clients, green or no errors or warnings associated with a health score of 8 to 10, grey or no data available associated with a health score of null or 0), or other indicator; column 362 can indicate the health of wired clients by score, color, descriptor, and so forth; column 364 can include user interface elements for drilling down to the health of the clients associated with a hierarchical site/building; column 366 can indicate the number of healthy network devices as a percentage; column 368 can indicate the health of access switches by score, color, descriptor, and so forth; column 370 can indicate the health of core switches by score, color, descriptor, and so forth; column 372 can indicate the health of distribution switches by score, color, descriptor, and so forth; column 374 can indicate the health of routers by score, color, descriptor, and so forth; column 376 can indicate the health of WLCs by score, color, descriptor, and so forth; column 378 can indicate the health of other network devices by score, color, descriptor, and so forth; and column 380 can include user interface elements for drilling down to the health of the network devices associated with a hierarchical site/building. In other embodiments, endpoints may be grouped in other ways besides wired or wireless, such as by device type (e.g., desktop, laptop, mobile phone, IoT device or more specific type of IoT device, etc.), manufacturer, model, operating system, and so forth. Likewise, network devices can also be grouped along these and other ways in additional embodiments.

The graphical user interface 300E can also include an overall health summary user interface element (e.g., a view, pane, tile, card, container, widget, dashlet, etc.) that includes a client health summary user interface element 384 indicating the number of healthy clients as a percentage, a color coded trend chart 386 indicating that percentage over a specific time period (e.g., as selected by the time period selection user interface element 354), a user interface element 388 breaking down the number of healthy clients as a percentage by client type (e.g., wireless, wired), a network infrastructure health summary user interface element 390 indicating the number of health network devices as a percentage, a color coded trend chart 392 indicating that percentage over a specific time period, and a device type user interface element 394 breaking down the number of network devices as a percentage by network device type (e.g., core switch, access switch, distribution switch, etc.).

The graphical user interface 300E can also include an issues user interface element 396 listing issues, if any, that must be addressed. Issues can be sorted based on timestamp, severity, location, device type, and so forth. Each issue may be selected to drill down to view a more detailed view of the selected issue.

Figure 3F:
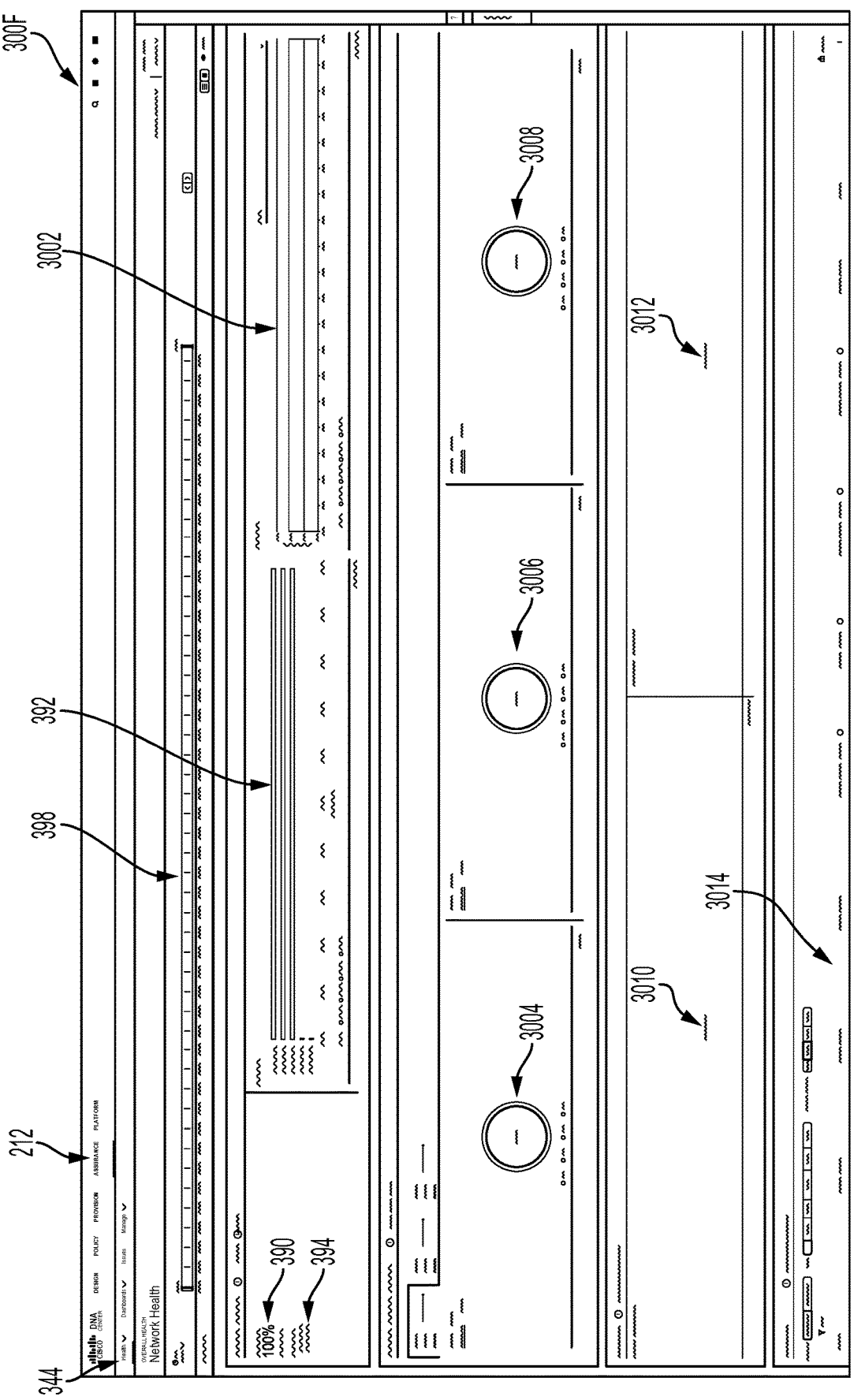

FIG. 3F illustrates a graphical user interface 300F, an example of a screen for an overview of the health of network devices alone, which may be navigated to, for instance, by toggling the health overview tool 345. The graphical user interface 300F can include a timeline slider 398 for selecting a more granular time range than a time period selection user interface element (e.g., the time period selection user interface element 354). The graphical user interface 300F can also include similar information to that shown in the graphical user interface 300E, such as a user interface element comprising a hierarchical site/building view and/or geographical map view similar to that of the graphical user interface 300E (except providing information only for network devices) (not shown here), the number of healthy network devices as a percentage 385, the color coded trend charts 387 indicating that percentage by device type, the breakdown of the number of healthy network devices by device type, and so forth. In addition, the graphical user interface 300F can display a view of the health of network devices by network topology (not shown). This view can be interactive, such as by enabling a user to zoom in or out, pan left or right, or rotate the topology (e.g., by 90 degrees).

In this example, the graphical user interface 300F also includes a color coded trend chart 3002 showing the performance of the network devices over a specific time period; network health by device type tabs including a system health chart 3004 providing system monitoring metrics (e.g., CPU utilization, memory utilization, temperature, etc.), a data plane connectivity chart 3006 providing data plane metrics, such as uplink availability and link errors, and a control plane connectivity chart 3008 providing control plane metrics for each device type; an AP analytics user interface element including an up and down color coded chart 3010 that provides AP status information (e.g., the number of APs connected to the network, and the number of APs not connected to the network, etc.) and a top number N of APs by client count chart 3012 that provides information about the APs that have the highest number of clients; a network devices table 3014 enabling a user to filter (e.g., by device type, health, or custom filters), view, and export network device information. A detailed view of the health of each network device can also be provided by selecting that network device in the network devices table 3014.

Figure 3G:
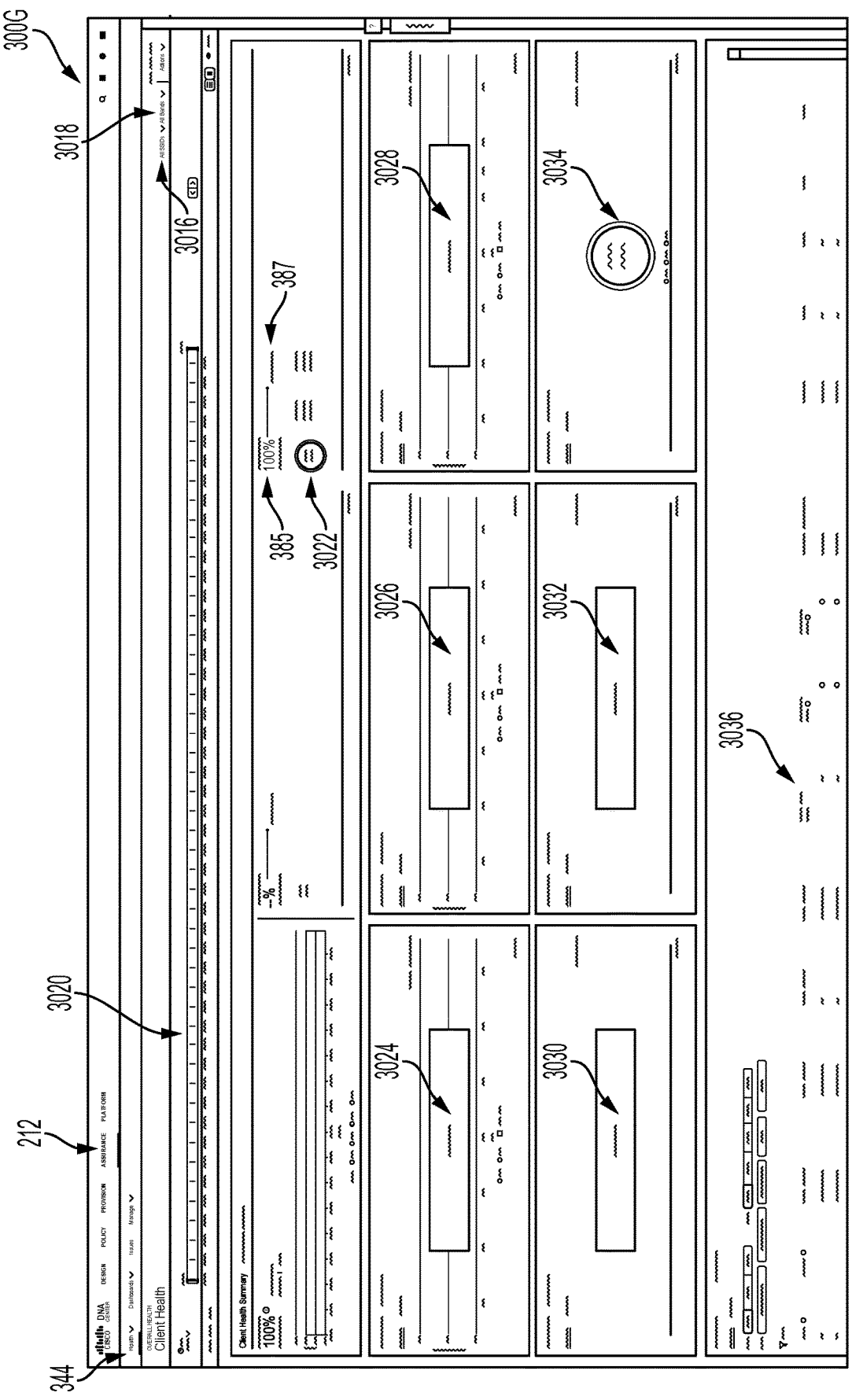

FIG. 3G illustrates a graphical user interface 300G, an example of a screen for an overview of the health of endpoints, which may be navigated to, for instance, by toggling the health overview tool 345. The graphical user interface 300G can include an SSID user interface selection element 3016 for viewing the health of wireless clients by all SSIDs or a specific SSID, a band frequency user interface selection element 3018 for viewing the health of wireless clients by all band frequencies or a specific band frequency (e.g., 2.4 GHz, 5 GHz, etc.), and a timeline slider 3020 that may operate similarly to the timeline slider 398.

The graphical user interface 300G can also include a client health summary user interface element that provides similar information to that shown in the graphical user interface 300E, such as the number of healthy clients as a percentage 385 and a color coded trend chart 387 indicating that percentage over a specific time period for each grouping of endpoints (e.g., wired/wireless, device type, manufacturer, model, operating system, etc.). In addition, the client health summary user interface element can include a color-coded donut chart that provides a count of poor (e.g., red and indicating a client health score of 1 to 3), fair (e.g., orange and indicating a client health score of 4 to 7), good (e.g., green and indicating a health score of 8 to 10), and inactive (e.g., grey and indicating a health score that is null or 0) endpoints. The count of endpoints associated with each color, health score, health descriptor, and so forth may be displayed by a selection gesture directed toward that color (e.g., tap, double tap, long press, hover, click, right-click, etc.).

The graphical user interface 300G can also include a number of other client health metric charts in all sites or a selected site over a specific time period, such as:
 Client onboarding times 3024;
 Received Signal Strength Indications (RSSIs) 3026;
 Connectivity signal-to-noise ratios (SNRs) 3028;
 Client counts per SSID 3030;
 Client counts per band frequency 3032;
 DNS requests and response counters (not shown); and
 Connectivity physical link state information 3034 indicating the distribution of wired endpoints that had their physical links up, down, and had errors.

In addition, the graphical user interface 300G can include an endpoints table 3036 enabling a user to filter endpoints by device type, health, data (e.g., onboarding time>threshold, association time>threshold, DHCP>threshold, AAA>threshold, RSSI>threshold, etc.), or custom filters), view, and export endpoint information (e.g., user identifier, hostname, MAC address, IP address, device type, last heard, location, Virtual Local Area Network (VLAN) identifier, SSID, overall health score, onboarding score, connection score, network device to which the endpoint is connected, etc.). A detailed view of the health of each endpoint can also be provided by selecting that endpoint in the endpoints table 3036.

Figure 3H:
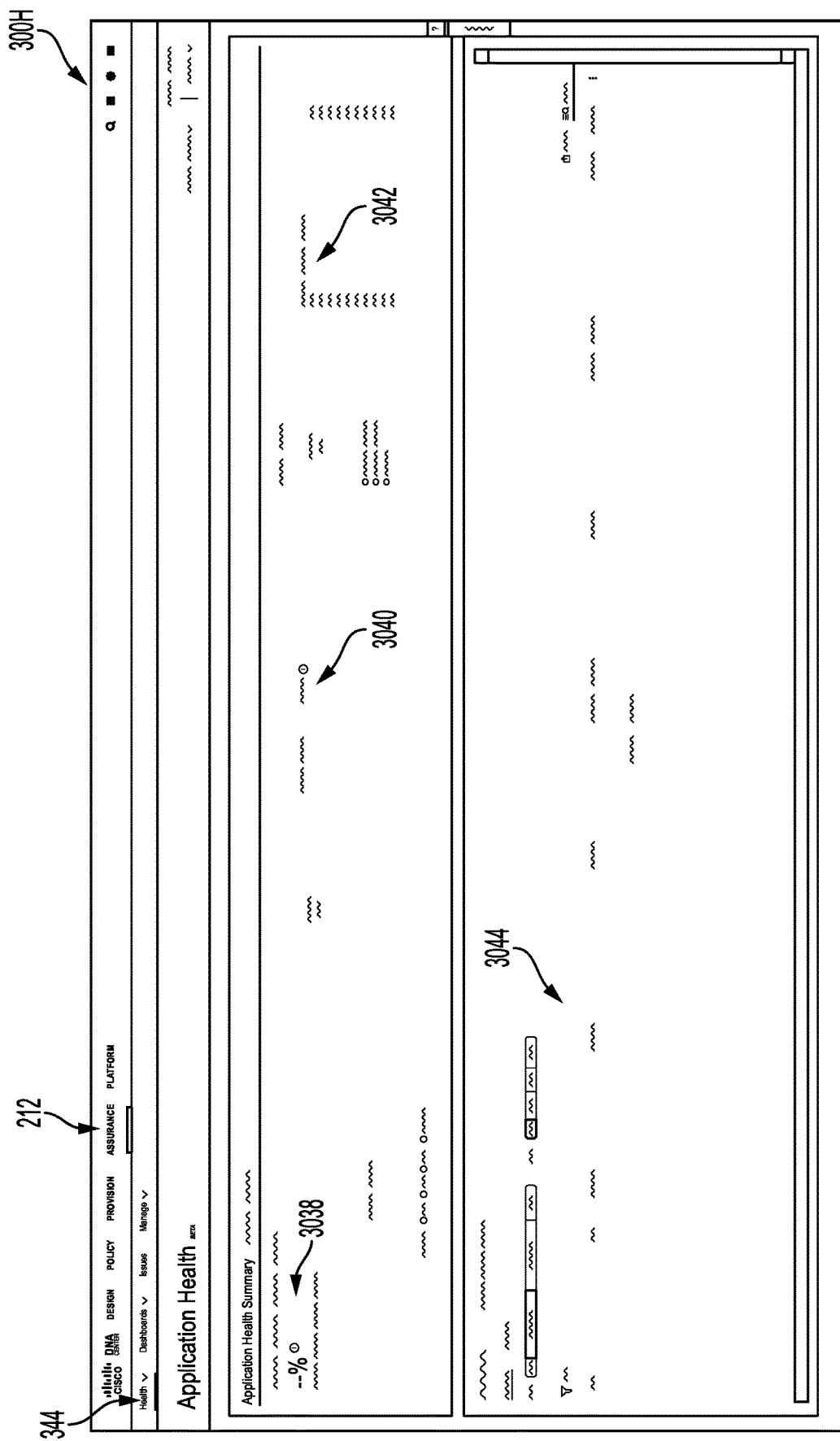

FIG. 3H illustrates a graphical user interface 300H, an example of a screen for an overview of the health of applications, which may be navigated to, for instance, by the toggling the health overview tool 345. The graphical user interface 300H can include application health summary user interface element including a percentage 3038 of the number of healthy applications as a percentage, a health score 3040 for each application or type of application (e.g., business relevant, business irrelevant, default; Hypertext Transfer Protocol (HTTP), VoIP, chat, email, bulk transfer, multimedia/streaming, etc.) running in the network, a top number N of applications by usage chart 3042. The health score 3040 can be calculated based on an application's qualitative metrics, such as packet loss, network latency, and so forth.

In addition, the graphical user interface 300H can also include an applications table 3044 enabling a user to filter (e.g., by application name, domain name, health, usage, average throughput, traffic class, packet loss, network latency, application latency, custom filters, etc.), view, and export application information. A detailed view of the health of each application can also be provided by selecting that application in the applications table 3044.

Figure 3I:
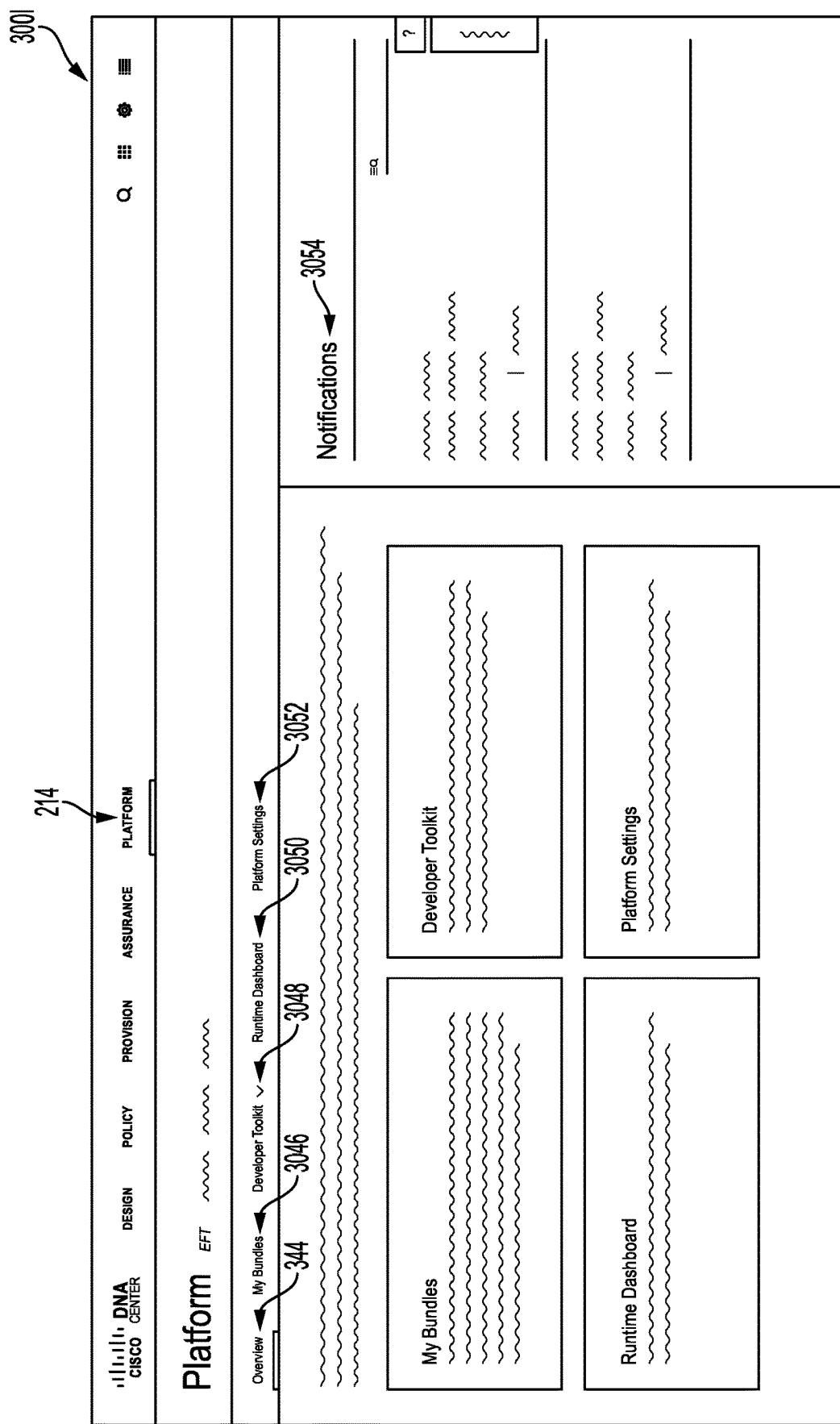

FIG. 3I illustrates an example of a graphical user interface 300I, an example of a landing screen for the platform functions 214. The graphical user interface 300C can include various tools and workflows for integrating with other technology systems. In this example, the platform integration tools and workflows include:
 A bundles tool 3046 for managing packages of domain-specific Application Programming Interfaces (APIs), workflows, and other features for network programming and platform integration;

A developer toolkit 3048 for accessing an API catalog listing the available APIs and methods (e.g., GET, PUT, POST, DELETE, etc.), descriptions, runtime parameters, return codes, model schemas, and so forth. In some embodiments, the developer toolkit 3048 can also include a "Try It" button to permit a developer to experiment with a particular API to better understand its behavior;

A runtime dashboard 3050 for viewing and analyzing basic metrics or API and integration flow usage;

A platform settings tool 3052 to view and set global or bundle-specific settings that define integration destinations and event consumption preferences; and A notifications user interface element 3054 for presenting notifications regarding the availability of software updates, security threats, and so forth.

Returning to FIG. 2, the controller layer 220 can comprise subsystems for the management layer 202 and may include a network control platform 222, a network data platform 224, and AAA services 226. These controller subsystems can form an abstraction layer to hide the complexities and dependencies of managing many network devices and protocols.

The network control platform 222 can provide automation and orchestration services for the network layer 230 and the physical layer 240, and can include the settings, protocols, and tables to automate management of the network and physical layers. For example, the network control platform 222 can provide the design functions 206, the policy functions 208, the provisioning functions 212, and the platform functions 214. In addition, the network control platform 222 can include tools and workflows for discovering switches, routers, wireless controllers, and other network devices (e.g., the network discovery tool 302); maintaining network and endpoint details, configurations, and software versions (e.g., the inventory management tool 304); Plug-and-Play (PnP) for automating deployment of network infrastructure (e.g., the network PnP tool 316), Path Trace for creating visual data paths to accelerate the troubleshooting of connectivity problems, Easy QoS for automating quality of service to prioritize applications across the network, and Enterprise Service Automation (ESA) for automating deployment of physical and virtual network services, among others. The network control platform 222 can communicate with network devices using Network Configuration (NETCONF)/Yet Another Next Generation (YANG), Simple Network Management Protocol (SNMP), Secure Shell (SSH)/Telnet, and so forth. In some embodiments, the Cisco® Network Control Platform (NCP) can operate as the network control platform 222

The network data platform 224 can provide for network data collection, analytics, and assurance, and may include the settings, protocols, and tables to monitor and analyze network infrastructure and endpoints connected to the network. The network data platform 224 can collect multiple types of information from network devices, including syslog, SNMP, NetFlow, Switched Port Analyzer (SPAN), and streaming telemetry, among others. The network data platform 224 can also collect use contextual information shared from In some embodiments, one or more Cisco DNA™ Center appliances can provide the functionalities of the management layer 202, the network control platform 222, and the network data platform 224. The Cisco DNA™ Center appliances can support horizontal scalability by adding additional Cisco DNA™ Center nodes to an existing cluster; high availability for both hardware components and software packages; backup and store mechanisms to support disaster discovery scenarios; role-based access control mechanisms for differentiated access to users, devices, and things based on roles and scope; and programmable interfaces to enable integration with third party vendors. The Cisco DNA™ Center appliances can also be cloud-tethered to provide for the upgrade of existing functions and additions of new packages and applications without having to manually download and install them.

The AAA services 226 can provide identity and policy services for the network layer 230 and physical layer 240, and may include the settings, protocols, and tables to support endpoint identification and policy enforcement services. The AAA services 226 can provide tools and workflows to manage virtual networks and security groups, and to create group-based policies and contracts. The AAA services 226 can identify and profile network devices and endpoints using AAA/RADIUS, 802.1X, MAC Authentication Bypass (MAB), web authentication, and EasyConnect, among others. The AAA services 226 can also collect and use contextual information from the network control platform 222, the network data platform 224, and the shared services 250, among others. In some embodiments, Cisco® ISE can provide the AAA services 226.

The network layer 230 can be conceptualized as a composition of two layers, an underlay 234 comprising physical and virtual network infrastructure (e.g., routers, switches, WLCs, etc.) and a Layer 3 routing protocol for forwarding traffic, and an overlay 232 comprising a virtual topology for logically connecting wired and wireless users, devices, and things and applying services and policies to these entities. Network devices of the underlay 234 can establish connectivity between each other, such as via IP. The underlay may use any topology and routing protocol.

In some embodiments, the network controller appliances 104 can provide a local area network (LAN) automation service, such as implemented by Cisco DNA™ Center LAN Automation, to automatically discover, provision, and deploy network devices. Once discovered, the automated underlay provisioning service can leverage Plug and Play (PnP) to apply the required protocol and network address configurations to the physical network infrastructure. In some embodiments, the LAN automation service may implement the Intermediate System to Intermediate System (IS-IS) protocol. Some of the advantages of IS-IS include neighbor establishment without IP protocol dependencies, peering capability using loopback addresses, and agnostic treatment of IPv4, IPv6, and non-IP traffic.

The overlay 232 can be a logical, virtualized topology built on top of the physical underlay 234, and can include a fabric data plane, a fabric control plane, and a fabric policy plane. In some embodiments, the fabric data plane can be created via packet encapsulation using Virtual Extensible LAN (VXLAN) with Group Policy Option (GPO). Some of the advantages of VXLAN-GPO include its support for both Layer 2 and Layer 3 virtual topologies (overlays), and its ability to operate over any IP network with built-in network segmentation.

In some embodiments, the fabric control plane can implement Locator/Identifier Separation Protocol (LISP) for logically mapping and resolving users, devices, and things. LISP can simplify routing by removing the need for each router to process every possible IP destination address and route. LISP can achieve this by moving remote destination to a centralized map database that allows each router to manage only its local routs and query the map system to locate destination endpoints.

The fabric policy plane is where intent can be translated into network policy. That is, the policy plane is where the network operator can instantiate logical network policy based on services offered by the network fabric 120, such as security segmentation services, QoS, capture/copy services, application visibility services, and so forth.

Segmentation is a method or technology used to separate specific groups of users or devices from other groups for the purpose of reducing congestion, improving security, containing network problems, controlling access, and so forth. As discussed, the fabric data plane can implement VXLAN encapsulation to provide network segmentation by using the virtual network identifier (VNID) and Scalable Group Tag (SGT) fields in packet headers. The network fabric 120 can support both macro-segmentation and micro-segmentation. Macro-segmentation logically separates a network topology into smaller virtual networks by using a unique network identifier and separate forwarding tables. This can be instantiated as a Virtual Routing and Forwarding (VRF) instance and referred to as a Virtual Network (VN). That is, a VN is a logical network instance within the network fabric 120 defined by a Layer 3 routing domain and can provide both Layer 2 and Layer 3 services (using the VNID to provide both Layer 2 and Layer 3 segmentation). Micro-segmentation logically separates user or device groups within a VN, by enforcing source to destination access control permissions, such as by using access control lists (ACLs). A scalable group is a logical object identifier assigned to a group of users, devices, or things in the network fabric 120. It can be used as source and destination classifiers in Security Group ACLs (SGACLs). The SGT can be used to provide address-agnostic group-based policies.

In some embodiments, the fabric control plane node 110 may implement the Locator/Identifier Separation Protocol (LISP) to communicate with one another and with the management cloud 102. Thus, the control plane nodes may operate a host tracking database, a map server, and a map resolver. The host tracking database can track the endpoints 130 connected to the network fabric 120 and associate the endpoints to the fabric edge nodes 126, thereby decoupling an endpoint's identifier (e.g., IP or MAC address) from its location (e.g., closest router) in the network.

The physical layer 240 can comprise network devices, such as switches and routers 110, 122, 124, and 126 and wireless elements 108 and 128 and network appliances, such as the network controller appliances 104, and the AAA appliances 106.

The shared services layer 250 can provide an interface to external network services, such as cloud services 252; Domain Name System (DNS), DHCP, IP Address Management (IPAM), and other network address management services 254; firewall services 256; Network as a Sensor (Naas)/Encrypted Threat Analytics (ETA) services; and Virtual Network Functions (VNFs) 260; among others. The management layer 202 and/or the controller layer 220 can share identity, policy, forwarding information, and so forth via the shared services layer 250 using APIs.

Figure 4:
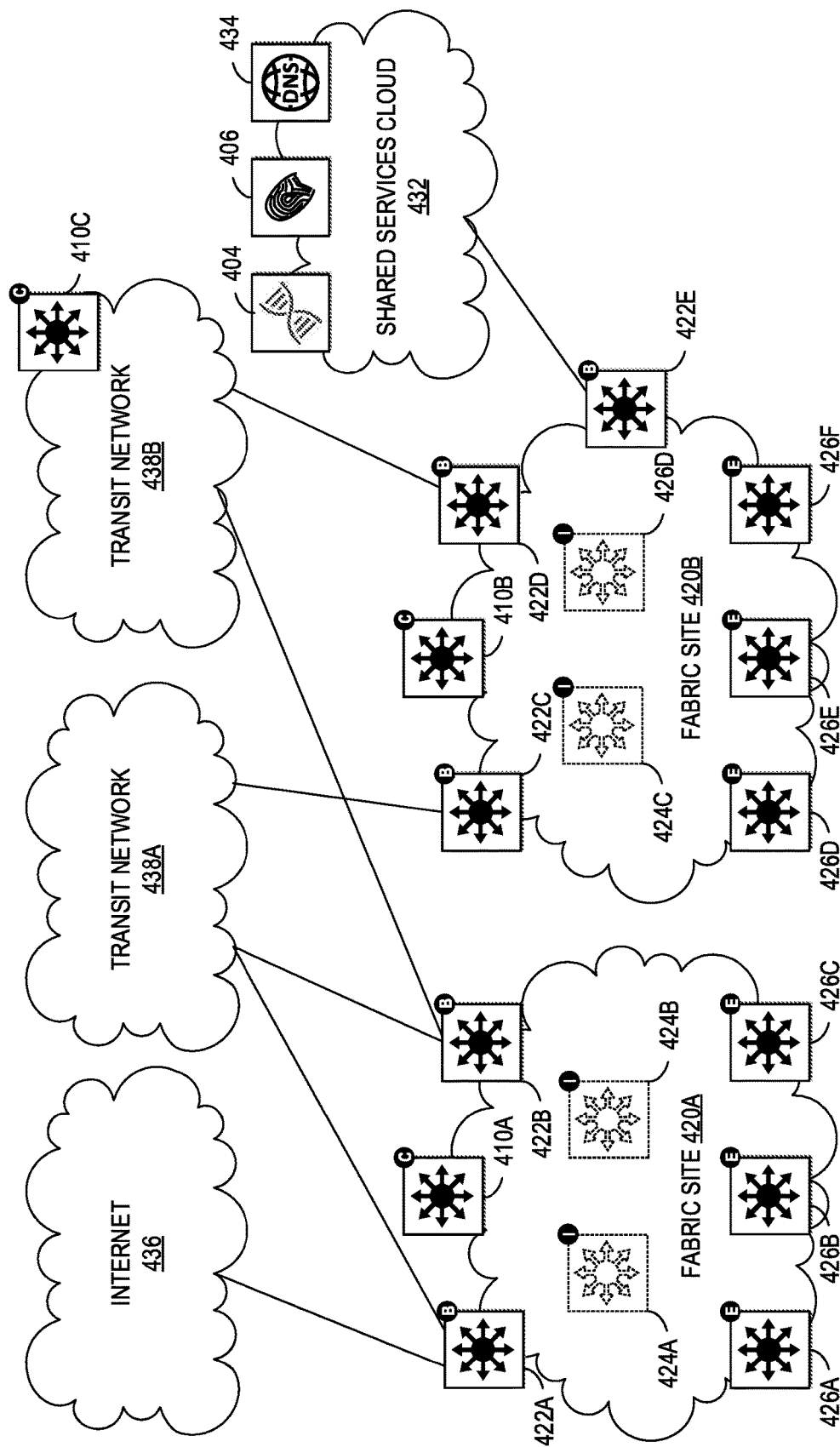
FIG. 4 illustrates an example of a physical topology for a multi-site enterprise network in accordance with an embodiment.

FIG. 4 illustrates an example of a physical topology for a multi-site enterprise network 400. In this example, the network fabric comprises fabric sites 420A and 420B. The fabric site 420A can include a fabric control plane node 410A, fabric border nodes 422A and 422B, fabric intermediate nodes 424A and 424B (shown here in dashed line and not connected to the fabric border nodes or the fabric edge nodes for simplicity), and fabric edge nodes 426A-D. The fabric site 420B can include a fabric control node 410B, fabric border nodes 422C-E, fabric intermediate nodes 424C and 424D, and fabric edge nodes 426D-F. Multiple fabric sites corresponding to a single fabric, such as the network fabric of FIG. 4, can be interconnected by a transit network. A transit network can be a portion of a network fabric that has its own control plane nodes and border nodes but does not have edge nodes. In addition, a transit network shares at least one border node with each fabric site that it interconnects.

In general, a transit network connects a network fabric to the external world. There are several approaches to external connectivity, such as a traditional IP network 436, traditional WAN 438A, Software-Defined WAN (SD-WAN) (not shown), or Software-Defined Access (SD-Access) 438B. Traffic across fabric sites, and to other types of sites, can use the control plane and data plane of the transit network to provide connectivity between these sites. A local border node can operate as the handoff point from the fabric site, and the transit network can deliver traffic to other sites. The transit network may use additional features. For example, if the transit network is a WAN, then features like performance routing may also be used. To provide end-to-end policy and segmentation, the transit network should be cable of carrying endpoint context information (e.g., VRF, SGT) across the network. Otherwise, a re-classification of the traffic may be needed at the destination site border.

The local control plane in a fabric site may only hold state relevant to endpoints that are connected to edge nodes within the local fabric site. The local control plane can register local endpoints via local edge nodes, as with a single fabric site (e.g., the network fabric 120). An endpoint that isn't explicitly registered with the local control plane may be assumed to be reachable via border nodes connected to the transit network. In some embodiments, the local control plane may not hold state for endpoints attached to other fabric sites such that the border nodes do not register information from the transit network. In this manner, the local control plane can be independent of other fabric sites, thus enhancing overall scalability of the network.

The control plane in the transit network can hold summary state for all fabric sites that it interconnects. This information can be registered to the transit control plane by border from different fabric sites. The border nodes can register Endpoint Identifier (EID) information from the local fabric site into the transit network control plane for summary EIDs only and thus further improve scalability.

The multi-site enterprise network 400 can also include a shared services cloud 432. The shared services cloud 432 can comprise one or more network controller appliances 404, one or more AAA appliances 406, and other shared servers (e.g., DNS; DHCP; IPAM; SNMP and other monitoring tools; NetFlow, syslog, and other data collectors, etc.) may reside. These shared services can generally reside outside of the network fabric and in a Global Routing Table (GRT) of an existing network. In this case, some method of inter-VRF routing may be required. One option for inter-VRF routing is to use a fusion router, which can be an external router that performs inter-VRF leaking (e.g., import/export of VRF routes) to fuse the VRFs together. Multi-Protocol can be used for this route exchange since it can inherently prevent routing loops (e.g., using the AS_PATH attribute). Other routing protocols can also be used but may require complex distribute-lists and prefix-lists to prevent loops.

However, there can be several disadvantages in using a fusion router to achieve inter-VN communication, such as route duplication because routes leaked from one VRF to another are programmed in hardware tables and can result in more Ternary Content Address Memory (TCAM) utilization, manual configuration at multiple touch points wherever route-leaking is implemented, loss of SGT context because SGTs may not be maintained across VRFs and must be re-classified once the traffic enters the other VRF, and traffic hairpinning because traffic may need to be routed to the fusion router, and then back to the fabric border node.

SD-Access Extranet can provide a flexible and scalable method for achieving inter-VN communications by avoiding route duplication because inter-VN lookup occurs in the fabric control plane (e.g., software) such that route entries do not need to be duplicated in hardware; providing a single touchpoint because the network management system (e.g., Cisco DNA™ Center) can automate the inter-VN lookup policy, making it a single point of management; maintaining SGT context because the inter-VN lookup occurs in the control plane nodes (e.g., software), and avoids hair-pinning because inter-VN forwarding can occur at the fabric edge (e.g., the same intra-VN) so traffic does not need to hairpin at the border node. Another advantage is that a separate VN can be made for each of the common resources that are needed (e.g., a Shared Services VN, an Internet VN, a data center VN, etc.).

Figure 5:
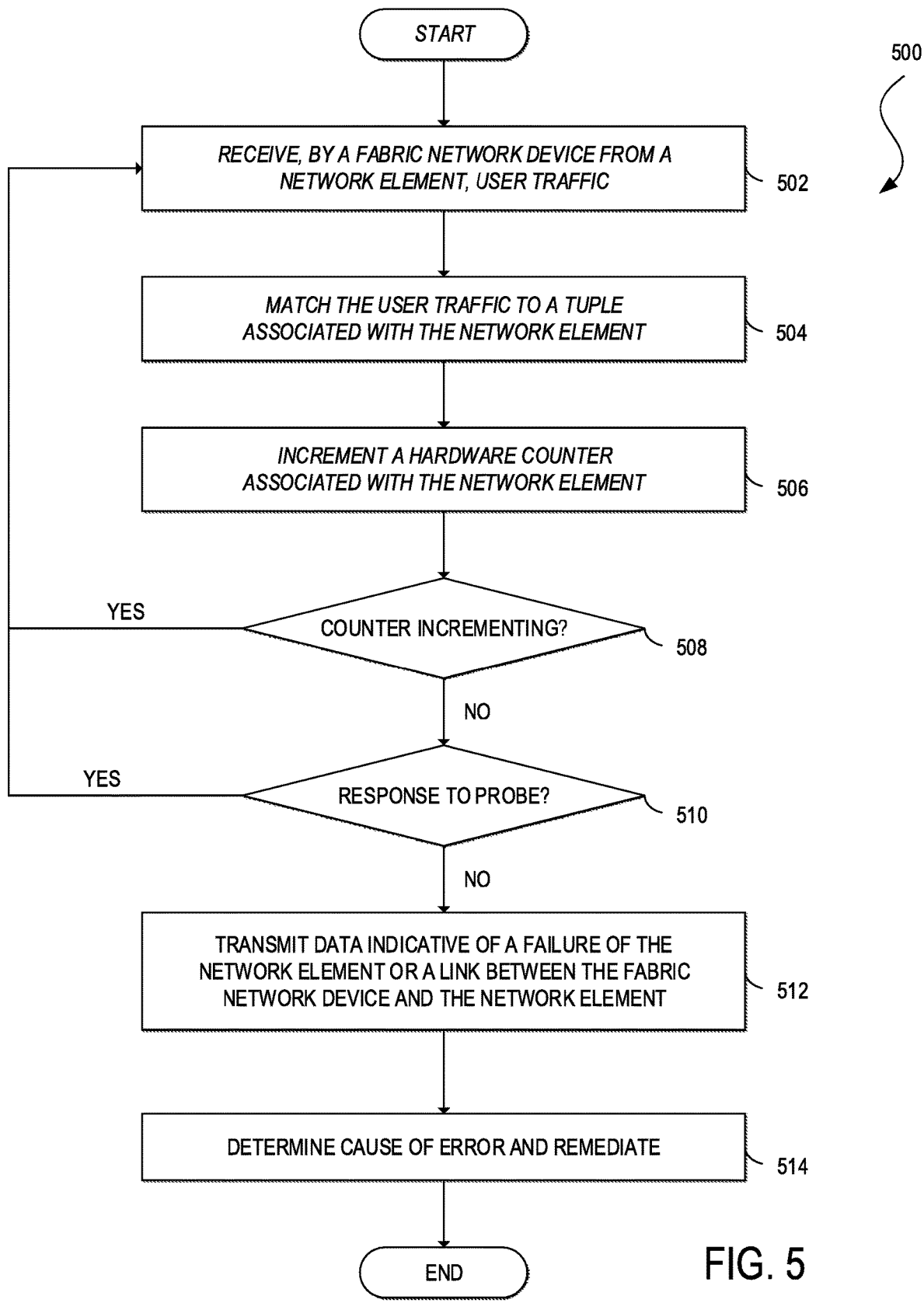
FIG. 5 illustrates an example of a process for passively monitoring a network device in accordance with an embodiment.

FIG. 5 illustrates an example of a process 500 for monitoring a state of a network device using user traffic. One of ordinary skill will understood that, for any processes discussed herein, there can be additional, fewer, or alternative steps performed in similar or alternative orders, or in parallel, within the scope of the various embodiments unless otherwise stated. The process 500 may be performed in part by a fabric node (e.g., the fabric control plane nodes 110, the fabric border nodes 122, fabric edge nodes 126, etc.), and a node. The node can be another network device, such as a fabric or non-fabric switch, a fabric or non-fabric router, or other network appliance (e.g., the network controller appliances 104, the AAA appliances 106, the shared services 250, etc.), or an endpoint (e.g., the endpoints 130).

The process 500 may begin with step 502 in which a fabric node (e.g., the fabric control plane nodes 110, the fabric border nodes 122, the fabric edge nodes 126, etc.) can receive user traffic from a node, such as a fabric or non-fabric node, network service (e.g., a cloud service, AAA services, a DNS service, a DHCP service, an IPAM service, a firewall, a NaaS/ETA service, a VNF, etc.), an endpoint (e.g., a POS server, a file server, a mail server, an IoT device server, or other device or service), or other device connected to the network fabric. In some embodiments, the node may be external to the network fabric.

At step 504, the fabric node can match identifying information (e.g., source, destination, network segment, etc.) extracted from the user traffic to a tuple associated with the node in the network device's counter matrix. Each row of the counter matrix can include the tuple and a counter. The tuple can include source one-tuples in which the network device is implicitly the destination, destination one-tuples in which the network device is implicitly the source, source-destination two-tuples, source-destination-network segment three-tuples; and so forth. In some embodiments, each row may also include one or more encapsulation flags indicating whether the traffic is encapsulated (e.g., VNID, VPN, SGT, EPG, etc.). In such embodiments, the fabric node may check the encapsulation flag to determine how to extract the identifying information (e.g., RLOC, IP address, etc.)

At step 506, the fabric node can increment the hardware counter for the tuple corresponding to the user traffic received at step 502. In some embodiments, the hardware counter may be implemented using a programmable application-specific integrated circuit (ASIC), such as the Cisco® UADP ASIC.

At decision block 508, the fabric node can monitor the hardware counter. If the counter is incrementing, the process 500 can return to step 502 and process new user traffic. However, if the fabric node instead determines that the hardware counter has not incremented for a first predetermined period of time, the process 500 can proceed to decision block 510 in which the fabric node can transmit an active probe to the node (e.g., ICMP probe) and wait for a response for a second predetermined period of time. If the node responds to the active probe before the second predetermined period elapses, the fabric node can deactivate the active probe and the process may return to step 502 in which the fabric node may process new user traffic. In some embodiments, the network device may also adjust the length of the first predetermined period of time to ensure fewer "false positives."

If the node does not respond to the active probe after the second predetermined period of time elapses, the process 500 may proceed to step 512 in which the fabric node can signal a network management system (e.g., as implemented by the network controller appliances 104) that there is a disconnection between the fabric network device and the node (e.g., failure of the node or the link between the fabric node and node) or otherwise transmit data indicative of the disconnection (e.g., the counter data).

The process 500 may conclude with step 514 in which the network management system can receive the signal or the data indicative of the disconnection from the fabric node (and second data indicative of a second disconnection between a second fabric node and the node). The network management system can determine a cause of the disconnection based on the data (and the second data). In some embodiments, the network management system can correlate the data and the second data to determine a scope of the disconnection (e.g., limited to the node, subnet, or other segment of the network). The network management system can attempt to remediate the disconnection (e.g., restart the node, reroute the network fabric around the node or and/or links to the node, provision a new node, etc.).

FIG. 6 illustrates an example of a network device 600 (e.g., switch, router, network appliance, etc.). The network device 600 can include a master central processing unit (CPU) 602, interfaces 604, and a bus 606 (e.g., a PCI bus). When acting under the control of appropriate software or firmware, the CPU 602 can be responsible for executing packet management, error detection, and/or routing functions. The CPU 602 preferably accomplishes all these functions under the control of software including an operating system and any appropriate applications software. The CPU 602 may include one or more processors 608 such as a processor from the Motorola family of microprocessors or the MIPS family of microprocessors. In an alternative embodiment, the processor 608 can be specially designed hardware for controlling the operations of the network device 600. In an embodiment, a memory 610 (such as non-volatile RAM and/or ROM) can also form part of the CPU 602. However, there are many different ways in which memory could be coupled to the system.

The interfaces 604 can be provided as interface cards (sometimes referred to as line cards). The interfaces 604 can control the sending and receiving of data packets over the network and sometimes support other peripherals used with the network device 600. Among the interfaces that may be provided are Ethernet interfaces, frame relay interfaces, cable interfaces, Digital Subscriber Line (DSL) interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 604 may include ports appropriate for communication with the appropriate media. In some cases, the interfaces 604 may also include an independent processor and, in some instances, volatile RAM. The independent processors may control communication intensive tasks such as packet switching, media control, and management. By providing separate processors for the communication intensive tasks, the interfaces 604 may allow the CPU 602 to efficiently perform routing computations, network diagnostics, security functions, and so forth.

Although the system shown in FIG. 6 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 600.

Regardless of the network device's configuration, it may employ one or more memories or memory modules (including the memory 610) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 7A:
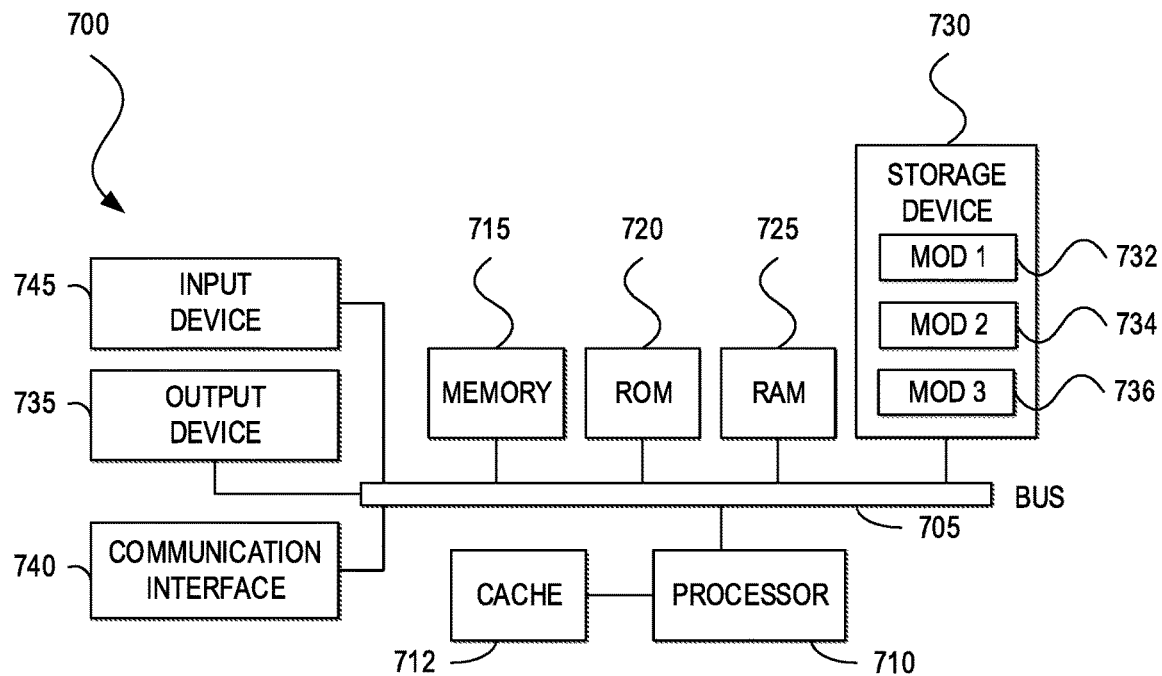
FIGS. 7A and 7B illustrate examples of systems in accordance with some embodiments.
Figure 7B:
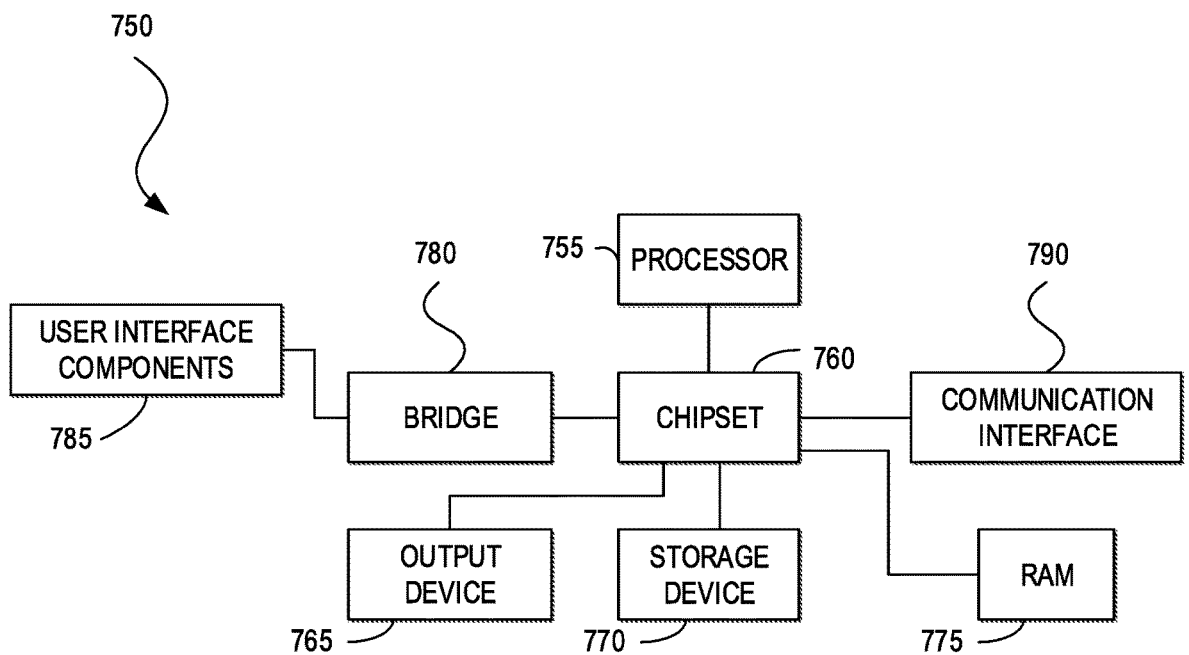

FIG. 7A and FIG. 7B illustrate systems in accordance with various embodiments. The more appropriate system will be apparent to those of ordinary skill in the art when practicing the various embodiments. Persons of ordinary skill in the art will also readily appreciate that other systems are possible.

FIG. 7A illustrates an example of a bus computing system 700 wherein the components of the system are in electrical communication with each other using a bus 705. The computing system 700 can include a processing unit (CPU or processor) 710 and a system bus 705 that may couple various system components including the system memory 715, such as read only memory (ROM) 720 and random access memory (RAM) 725, to the processor 710. The computing system 700 can include a cache 712 of high-speed memory connected directly with, in close proximity to, or integrated as part of the processor 710. The computing system 700 can copy data from the memory 715, ROM 720, RAM 725, and/or storage device 730 to the cache 712 for quick access by the processor 710. In this way, the cache 712 can provide a performance boost that avoids processor delays while waiting for data. These and other modules can control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in the storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing system 700, an input device 745 can represent any number of input mechanisms, such as a microphone for speech, a touch-protected screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing system 700. The communications interface 740 can govern and manage the user input and system output. There may be no restriction on operating on any particular hardware arrangement and therefore the basic features here may easily be substituted for improved hardware or firmware arrangements as they are developed.

The storage device 730 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 730 can include the software modules 732, 734, 736 for controlling the processor 710. Other hardware or software modules are contemplated. The storage device 730 can be connected to the system bus 705. In some embodiments, a hardware module that performs a particular function can include a software component stored in a computer-readable medium in connection with the necessary hardware components, such as the processor 710, bus 705, output device 735, and so forth, to carry out the function.

FIG. 7B illustrates an example architecture for a chipset computing system 750 that can be used in accordance with an embodiment. The computing system 750 can include a processor 755, representative of any number of physically and/or logically distinct resources capable of executing software, firmware, and hardware configured to perform identified computations. The processor 755 can communicate with a chipset 760 that can control input to and output from the processor 755. In this example, the chipset 760 can output information to an output device 765, such as a display, and can read and write information to storage device 770, which can include magnetic media, solid state media, and other suitable storage media. The chipset 760 can also read data from and write data to RAM 775. A bridge 780 for interfacing with a variety of user interface components 785 can be provided for interfacing with the chipset 760. The user interface components 785 can include a keyboard, a microphone, touch detection and processing circuitry, a pointing device, such as a mouse, and so on. Inputs to the computing system 750 can come from any of a variety of sources, machine generated and/or human generated.

The chipset 760 can also interface with one or more communication interfaces 790 that can have different physical interfaces. The communication interfaces 790 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 755 analyzing data stored in the storage device 770 or the RAM 775. Further, the computing system 750 can receive inputs from a user via the user interface components 785 and execute appropriate functions, such as browsing functions by interpreting these inputs using the processor 755.

It will be appreciated that computing systems 700 and 750 can have more than one processor 710 and 755, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method, comprising:
    receiving, by a fabric node from a node, user traffic;
    matching, by the fabric node, the user traffic to a tuple stored in a hardware counter matrix of the fabric node, the tuple corresponding to a count in the hardware counter matrix and uniquely associated with the node for identifying an issue with either or both the node and a network path connected to the node, wherein the issue at least one of a link loss issue associated with the node, a device reload issue associated with the node, and a fault associated with a network outage at the node;
    incrementing, by the fabric node, the count; and
    in response to an occurrence of the issue with either or both the node and the network path connected to the node, as indicated by the count not incrementing within a first time, transmitting, by the fabric node to the node, an active probe.

2. The computer-implemented method of claim 1, further comprising:
    in response to not receiving a response to the active probe within a second time, transmitting, by the fabric node to a network management system, data indicative of a disconnection between the fabric node and the node.

3. The computer-implemented method of claim 2, further comprising:
    determining, by the network management system, a cause of the disconnection based on the data indicative of the disconnection.

4. The computer-implemented method of claim 2, further comprising:
    receiving, by the network management system from a second fabric node, second data indicative of a second disconnection between the second fabric node and the node; and
    determining, by the network management system, a scope of the disconnection based on correlation of the data indicative of the disconnection and the second data indicative of the second disconnection.

5. The computer-implemented method of claim 1, further comprising:
    receiving a response to the active probe from the node within a second time;
    deactivating the active probe; and
    incrementing the count.

6. The computer-implemented method of claim 5, further comprising:
    transmitting, by the fabric node to a network management system, data indicative of a false positive of a disconnection between the fabric node and the node; and
    adjusting the first time based on the false positive.

7. The computer-implemented method of claim 1, wherein the fabric node is one of a fabric edge node, a fabric border node, or a fabric control plane node.

8. The computer-implemented method of claim 1, wherein the node is a second fabric node.

9. The computer-implemented method of claim 1, wherein the node is one of a service or an endpoint.

10. The computer-implemented method of claim 1, wherein the tuple includes one of a Source Route Locator (RLOC) or a source network address.

11. The computer-implemented method of claim 10, wherein the tuple further includes one of a destination RLOC or a destination network address.

12. The computer-implemented method of claim 11, wherein the tuple further includes a network segment identifier.

13. A system, comprising:
one or more processors;
a hardware counter matrix; and
memory including instructions that, when executed by the one or more processors, cause the system to:
  receive user traffic from a node;
  match the user traffic to a tuple stored in the hardware counter matrix, the tuple corresponding to a count in the hardware counter matrix and uniquely associated with the node for identifying an issue with either or both the node and a network path connected to the node, wherein the issue at least one of a link loss issue associated with the node, a device reload issue associated with the node, and a fault associated with a network outage at the node;
  increment the count; and
  in response to an occurrence of the issue with either or both the node and the network path connected to the node, as indicated by the count not incrementing within a first time, transmit an active probe to the node.

14. The system of claim 13, wherein the instructions, when executed, further cause the system to:
  in response to not receiving a response to the active probe within a second time, transmitting data indicative of a disconnection between the system and the node to a network management system.

15. The system of claim 13, wherein the instructions, when executed, further cause the system to:
  receive a response to the active probe from the node;
  deactivate the active probe; and
  increment the count.

16. The system of claim 13, wherein the instructions, when executed, further cause the system to:
  transmit data indicative of a false positive of a disconnection between the system and the node; and
  adjust the first time based on the false positive.

17. A non-transitory computer-readable storage medium including instructions that, upon being executed by one or more processors of a system, cause the system to:
  receive user traffic from a node;
  match the user traffic to a tuple stored in a hardware counter matrix of the system, the tuple corresponding to a count in the hardware counter matrix and uniquely associated with the node for identifying an issue with either or both the node and a network path connected to the node, wherein the issue at least one of a link loss issue associated with the node, a device reload issue associated with the node, and a fault associated with a network outage at the node;
  increment the count; and
  in response to an occurrence of the issue with either or both the node and the network path connected to the node, as indicated by the count not incrementing within a first time, transmit an active probe to the node.

18. The non-transitory computer-readable storage medium of claim 17, the instructions, when executed, further cause the system to:
  in response to not receiving a response to the active probe within a second time, transmit data indicative of a disconnection between the system and the node to a network management system.

19. The non-transitory computer-readable storage medium of claim 18, the instructions, when executed, further cause the system to:
  determine a cause of the disconnection based on the data indicative of the disconnection.

20. The non-transitory computer-readable storage medium of claim 19, the instructions, when executed, further cause the system to:
  receive, from a second fabric node, second data indicative of a second disconnection between the second fabric node and the node; and
  determining a scope of the disconnection based on correlation of the data indicative of the disconnection and the second data indicative of the second disconnection.

* * * * *